(12) United States Patent
Yu et al.

(10) Patent No.: US 11,093,735 B2
(45) Date of Patent: Aug. 17, 2021

(54) IMAGE PROCESSING METHOD, IMAGE PROCESSING APPARATUS, AND NON-TRANSITORY COMPUTER-READABLE STORAGE MEDIUM STORING PROGRAM FOR IMAGE PROCESSING HAVING GESTURE RECOGNITION

(71) Applicant: FUJITSU LIMITED, Kawasaki (JP)

(72) Inventors: Shanshan Yu, Tama (JP); Norihiro Kakuko, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 16/444,106

(22) Filed: Jun. 18, 2019

(65) Prior Publication Data
US 2019/0303657 A1  Oct. 3, 2019

Related U.S. Application Data

(63) Continuation of application No. PCT/JP2017/047209, filed on Dec. 28, 2017.

(30) Foreign Application Priority Data

Jan. 20, 2017 (JP) .............................. JP2017-008863

(51) Int. Cl.
*G06K 9/62* (2006.01)
*G06K 9/00* (2006.01)
(Continued)

(52) U.S. Cl.
CPC ..... *G06K 9/00335* (2013.01); *G06K 9/00228* (2013.01); *G06T 7/20* (2013.01);
(Continued)

(58) Field of Classification Search
CPC . G06K 9/00335; G06K 9/00221–2009/00328; G06T 7/20–292; G06T 2207/30196–30201
See application file for complete search history.

(56) References Cited

U.S. PATENT DOCUMENTS 6,677,969 B1 *  1/2004  Hongo .................... G06F 3/013
                                                                345/156
2015/0063640 A1    3/2015  Anabuki

FOREIGN PATENT DOCUMENTS

EP      1770596 A1 *  4/2007  ......... G06K 9/00335
JP      2000-315259      11/2000
(Continued)

OTHER PUBLICATIONS

Kawato et al., "Real-time Detection of Nodding and Head-shaking by Directly Detecting and Tracking the "Between-Eyes"", Published in: Proceedings Fourth IEEE International Conference on Automatic Face and Gesture Recognition (Cat. No. PR00580), Published on IEEE Explore on Aug. 6, 2002, 8 pgs total. (Year: 2002).*

(Continued)

*Primary Examiner* — Brian Werner
(74) *Attorney, Agent, or Firm* — Fujitsu Patent Center

(57) ABSTRACT

A method includes: executing acquisition processing that includes acquiring an image frame captured by an imaging apparatus; executing a determination processing that includes determining whether a head region is included in the acquired image frame; executing calculation processing that includes calculating a first amount of change in time series of the head region by using a position of the head region in the image frame and a position of the head region in another image frame following the image frame; executing determination processing that includes determining a threshold to be compared with the first amount of change (Continued)

based on a frequency distribution of amounts of change in time series of the head region in a past image frame group prior to the acquired image frame; and executing evaluation processing that includes evaluating the first amount of change by comparing the determined threshold and the first amount of change.

9 Claims, 18 Drawing Sheets

(51) Int. Cl.
    *G06T 7/73*           (2017.01)
    *G06T 7/50*           (2017.01)
    *G06T 7/20*           (2017.01)
    *H04N 5/225*         (2006.01)

(52) U.S. Cl.
    CPC ............. *G06T 7/50* (2017.01); *G06T 7/74* (2017.01); *H04N 5/225* (2013.01); *G06T 2207/30196* (2013.01)

(56) References Cited

FOREIGN PATENT DOCUMENTS

| JP | 2009-267621 | 11/2009 |
|----|-------------|---------|
| JP | 2015-046732 | 3/2015  |
| JP | 2015-064698 | 4/2015  |

OTHER PUBLICATIONS

Davis et al., "A Perceptual User Interface for Recognizing Head Gesture Acknowledgements", PUI 2001 Orlando FL, USA Copyright 2001 ACM 1-58113-448-7-Nov. 14, 2001, pp. 1-7. (Year: 2001).*

International Search Report and Written Opinion of the International Searching Authority, mailed in connection with PCT/JP2017/047209 and dated Feb. 27, 2018, with partial English translation (9 pages).

* cited by examiner

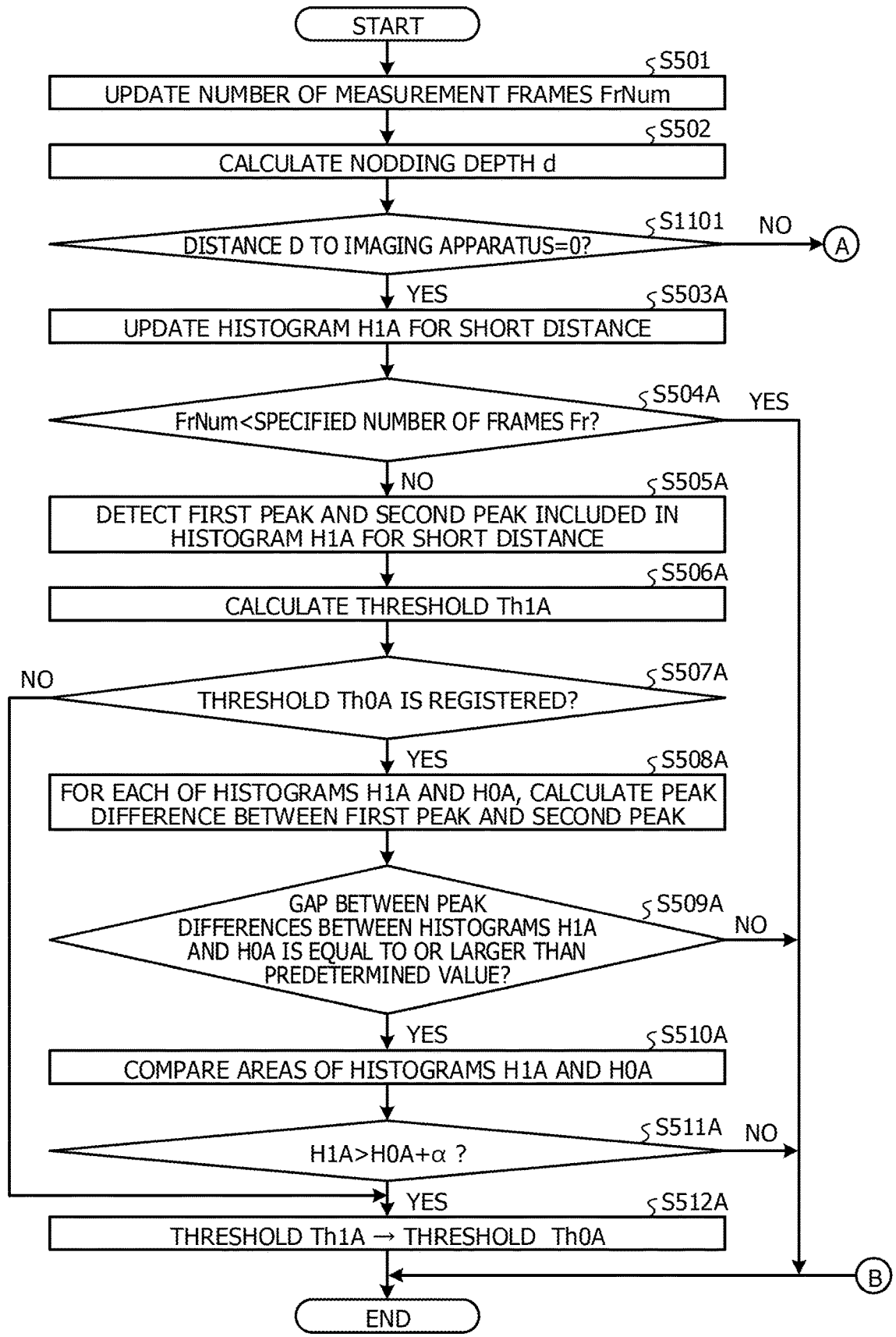

IMAGE PROCESSING METHOD, IMAGE PROCESSING APPARATUS, AND NON-TRANSITORY COMPUTER-READABLE STORAGE MEDIUM STORING PROGRAM FOR IMAGE PROCESSING HAVING GESTURE RECOGNITION

CROSS-REFERENCE TO RELATED APPLICATION

This application is a continuation application of International Application PCT/JP2017/047209 filed on Dec. 28, 2017 and designated the U.S., the entire contents of which are incorporated herein by reference. The International Application PCT/JP2017/047209 is based upon and claims the benefit of priority of the prior Japanese Patent Application No. 2017-008863, filed on Jan. 20, 2017, the entire contents of which are incorporated herein by reference.

FIELD

The embodiments discussed herein are related to an image processing method, an image processing apparatus, and a non-transitory computer-readable storage medium storing a program for image processing.

BACKGROUND

In communications, people use nonverbal communications such as movements and actions, that is, gestures, besides verbal communications. In the nonverbal communications, a nod is a kind of a motion in which a listener of speech gives feedback to a speaker of the speech and is useful in analyzing emotions and feelings of a person. As an example of a technique of quantitatively analyzing a frequency of such nods, there is a technique of detecting a nod from an amount of vertical change of a face region included in an image.

Examples of the related art include Japanese Laid-open Patent Publication No. 2000-315259.

SUMMARY

According to an aspect of the embodiments, a method for image processing includes: executing an acquisition processing that includes acquiring an image frame captured using an imaging apparatus; executing a determination processing that includes determining whether a head region is included in the acquired image frame; executing a calculation processing that includes calculating, when determining that the head region is included in the image frame, a first amount of change in time series of the head region by using a position of the head region in the image frame and a position of the head region included in another image frame following the image frame; executing a threshold determination processing that includes determining a threshold to be compared with the first amount of change based on a frequency distribution of amounts of change in time series of the head region included in a past image frame group prior to the acquired image frame; and executing an evaluation processing that includes evaluating the first amount of change by comparing the determined threshold and the first amount of change.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 15A and 15B are a flowchart illustrating a procedure of threshold determination processing according to the second embodiment;

DESCRIPTION OF EMBODIMENTS

However, in the technique explained above, as explained below, a shallow nod and a deep nod having different meanings sometimes are not classified.

That is, for example, in the technique explained above, assumption that a nod has a different meaning depending on the depth of the nod is absent in the first place. For example, the shallow nod includes a meaning of indicating understanding of speech of a speaker by a listener and urging the speaker to further speak. On the other hand, the deep nod has a meaning of affirming and sympathizing with an opinion of the speaker. Although the meanings of the shallow nod and the deep nod are different in this way, in the technique explained above, nods having different meanings are identified and detected as the same nod.

In one aspect, an object of the present disclosure is to provide an image processing program, an image processing method, and an image processing apparatus that may classify nods having different depths.

An image processing program, an image processing method, and an image processing apparatus according to this application are explained below with reference to the accompanying drawings. Note that embodiments described herein do not limit disclosed techniques. The embodiments may be combined as appropriate in a range in which contradiction of processing contents is not caused.

First Embodiment

Figure 1:
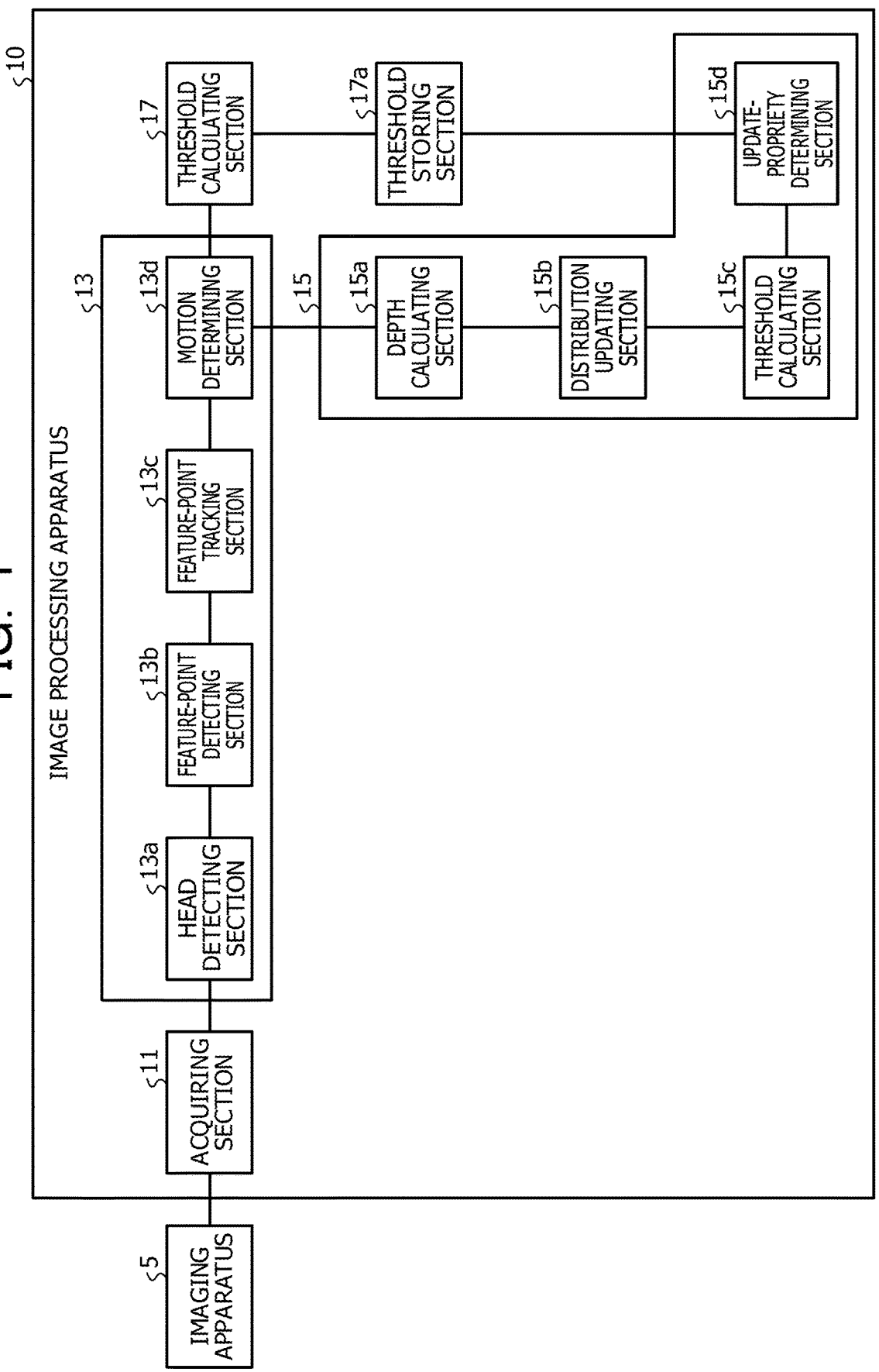
FIG. 1 is a block diagram illustrating a functional configuration of an image processing apparatus according to a first embodiment.

FIG. 1 is a block diagram illustrating a functional configuration of an image processing apparatus 10 according to a first embodiment. The image processing apparatus 10 illustrated in FIG. 1 provides an image processing service for detecting, from an image, a nod, which is a kind of a feedback motion performed by a listener of speech in response to the speech of a speaker, in nonverbal communication such as gestures.

As a part of such an image processing service, the image processing apparatus 10 realizes classification of a shallow nod and a deep nod having different meanings. For example, the shallow nod includes a meaning of indicating understanding of speech of a speaker by a listener and urging the speaker to further speak. On the other hand, the deep nod has a meaning of affirming and sympathizing with an opinion of the speaker.

However, in the existing technique, assumption that a nod has a different meaning depending on the depth of the nod is absent in the first place. Even if the existing technique is improved and nods detected from an image are classified into a shallow nod and a deep nod according to determination using a predetermined threshold, the classification is not necessarily be correctly performed. This is because a positional relation between an imaging apparatus that captures an image and a head, which is an object, is not necessarily fixed.

Figure 2:
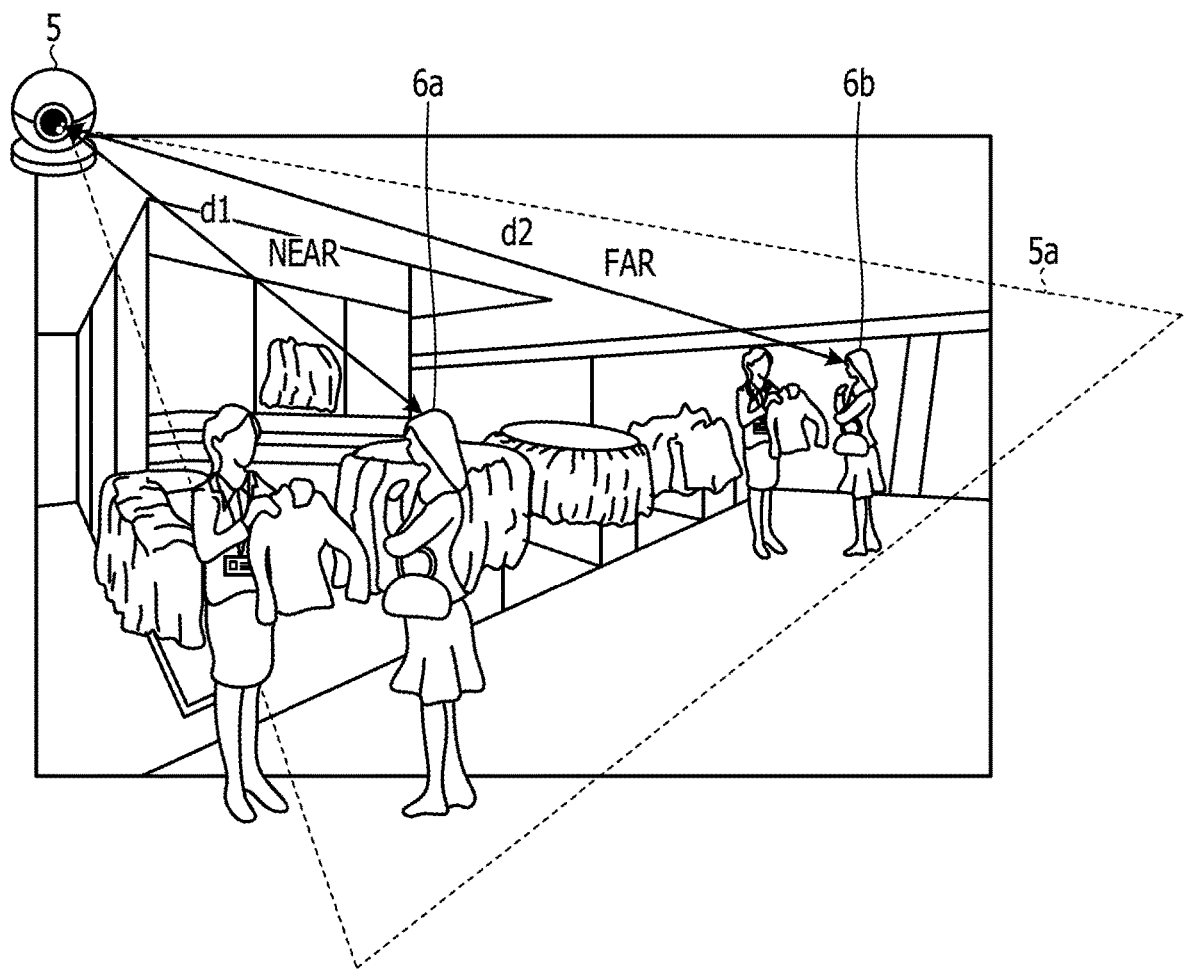
FIG. 2 is a diagram illustrating an example of a use case.

FIG. 2 is a diagram illustrating an example of a use case. In FIG. 2, a scene is illustrated in which, as preprocessing of feedback of customer satisfaction with customer service by a store clerk belonging to a selling area of an apparel shop, a nod of the customer detected from an image captured by an imaging apparatus 5 is classified. As illustrated in FIG. 2, the selling area of the apparel shop not necessarily includes only one apparel appliance on which clothes and the like are displayed, for example, glass table or caster and sometimes includes a plurality of apparel appliances. The imaging apparatus 5 is set in a position where more apparel appliances of the plurality of apparel appliances may be included in an imaging range 5a.

Under such a setting state of the imaging apparatus 5, a positional relation between the imaging apparatus 5 and the head of a customer, which is an object, is not fixed. For example, in some cases, customer service is performed in a positional relation in which the distance between the imaging apparatus 5 and a head 6a of a customer is d1 and, in other cases, customer service is performed in a positional relation in which the distance between the imaging apparatus 5 and a head 6b of a customer is d2. If the positional relations are different in this way, even when nods having the same depth are performed, a difference occurs between amounts of change in the vertical direction of the heads appearing in an image frame. That is, for example, even when the nods having the same depth are performed, an amount of vertical change of the head appearing in the image frame in a near positional relation is larger than an amount of vertical change of the head appearing in the image frame in a far positional relation.

Therefore, it is difficult to classify nods detected from an image into a shallow nod and a deep nod according to determination using a fixed threshold. This is because, if the threshold is set such that nods detected from the image frame in the near positional relation may be classified into the shallow nod and the deep nod, even if a nod detected from the image frame in the far positional relation is the deep nod, it is more likely that the nod is classified into the shallow nod by mistake. This is because, if the threshold is set such that nods detected from the image frame in the far positional relation may be classified into the shallow nod and the deep nod, even if a nod detected from the image frame in the near positional relation is the shallow nod, it is more likely that the nod is classified into the deep nod by mistake.

Therefore, the image processing apparatus 10 according to this embodiment determines, based on a frequency distribution of depths of nods detected from an image frame captured by the imaging apparatus 5, a threshold for classifying the depths of the nods detected from the image frame into a shallow nod and a deep nod. That is, for example, even when the positional relation between the imaging apparatus 5 and the head of the customer, who is the object, changes, the frequency distribution of the depths of the nods has a shape having bimodality including two ridges of a distribution corresponding to the shallow nod and a distribution corresponding to the deep nod. Therefore, by using, as an example of the threshold, a threshold that may separate the two ridges, for example, depth of a nod in a trough portion formed between the two ridges, it is possible to determine a threshold that may classify the shallow nod and the deep nod irrespective of the positional relation between the imaging apparatus 5 and the object.

The image processing apparatus 10 illustrated in FIG. 1 may be implemented as any computer such as a personal computer, various portable terminal apparatuses, and a server apparatus. The image processing apparatus 10 includes, as illustrated in FIG. 1, an acquiring section 11, a motion detecting section 13, a threshold determining section 15, a threshold storing section 17a, and a classifying section 17.

Functional sections such as the acquiring section 11, the motion detecting section 13, the threshold determining section 15, and the classifying section 17 illustrated in FIG. 1 are implemented by a hardware processor such as a central processing unit (CPU) or a micro processing unit (MPU). That is, for example, the functional sections are virtually realized by the processor developing, on a memory such as a random access memory (RAM), as a process, an image processing program for realizing the image processing service explained above. The CPU or the MPU is illustrated as an example of the processor. However, the functional sections may be realized by any processor irrespective of whether the processor is a general purpose or specialized processor. Besides, the functional sections may be realized by hard wired logic such as an application specific integrated circuit (ASIC) or a field programmable gate array (FPGA).

Besides the threshold storing section 17a illustrated in FIG. 1, as a work area used by the functional sections, as an example, a part of various semiconductor memory elements, for example, a random access memory (RAM), a flash memory, or a storage region thereof may be adopted. A main storage device does not necessarily have to be used. An auxiliary storage device such as a hard disk drive (HDD), an optical disk, or a solid state drive (SSD) may be adopted.

In FIG. 1, solid lines representing the functional sections and a relation of input and output of data to and from the functional sections are illustrated. However, this is only an illustration and does not hinder the functional configuration of the image processing apparatus 10 from having a functional configuration other than the example illustrated in FIG. 1. That is, for example, the image processing apparatus 10 may have functional sections other than the functional sections explained above. For example, although not illustrated in FIG. 1, the image processing apparatus 10 may include a communication interface that connects the image processing apparatus 10 and other apparatuses, for example, an interface for connection to a network. The relation of the input and the output of the data illustrated in FIG. 1 indicates that the data is transmitted at least from one to the other. Exchange of the data does not necessarily have to be bidirectionally performed.

The acquiring section 11 is a processing section that acquires an image frame.

As an embodiment, the acquiring section 11 may acquire an image frame captured by the imaging apparatus 5. The acquiring section 11 may also acquire the image frame from an auxiliary storage device such as a hard disk or an optical disk or a removable medium such as a memory card or a Universal Serial Bus (USB) memory that accumulates a series of image frames. Besides, the acquiring section 11 may also acquire the image frame by receiving the image frame from an external apparatus via a network. A path through which the image processing apparatus 10 acquires an image may be any path such as the imaging apparatus 5, the network, or the recording medium in this way and is not limited to a specific path. Thereafter, the acquiring section 11 inputs the image frame acquired through any path to a functional section in a post stage, that is, for example, the motion detecting section 13.

The motion detecting section 13 is a processing section that detects a motion such as a movement, an action, or a gesture of a person from an image. As a kind of the motion, as an example, a nod is detected.

The motion detecting section 13 includes, as illustrated in FIG. 1, a head detecting section 13a, a feature-point detecting section 13b, a feature-point tracking section 13c, and a motion determining section 13d. The motion detecting section 13 is an example of a determining section and a calculating section.

The head detecting section 13a is a processing section that executes head detection. In the following explanation, face detection is used as an example of the head detection. However, the head detection may be used instead of the face detection. The face detection and the head detection may also be adaptively switched and used. For example, when a face region is not detected by the face detection, a head region may be detected by the head detection. When a head region is not detected by the head detection, it is also possible to determine that the head is not included in an image frame and stop the subsequent processing.

As an embodiment, the head detecting section 13a detects a face region from an image frame acquired by the acquiring section 11. For example, a face detection algorithm proposed by P. Viola and M. Jones in a literature described below may be used. That is, for example, learning samples of a positive sample in which a face is included in an image and a negative sample in which a face is not included in an image are learned according to a learning algorithm such as Ada-Boost. According to this learning, for each weak discriminator that discriminates a face or a non-face from a rectangular pattern of a Haar-like characteristic calculated in a window having a predetermined size, for example, 24 pixels×24 pixels or 64 pixels×64 pixels, for scanning an input image, weight given to the weak discriminator is updated for a predetermined number of rounds. As a result, a strong discriminator that discriminates a face or a non-face according to weighted majority decision of the weak discriminator is generated. Then, every time an image is acquired by the acquiring section 11, the head detecting section 13a scans the image or an integrated image of the image on a window of the strong discriminator. Consequently, the head detecting section 13a extracts, as a face region, a window in which a face is detected by the strong discriminator. In addition, at this time, in order to extract a face region of a customer rather than a face region of a store clerk, processing for, using an employee card or the like carried by the store clerk as a marker of the store clerk, excerpting and extracting a face region belonging to an object to which the same label as a label of an object without the marker is given in a face region extracted from an image frame may also be added.

P. Viola and M. Jones, "Robust Real-Time Face Detection", *International Journal of Computer Vision* 57(2), pp. 137-154, 2004

In the above illustration, the discriminator obtained by the machine learning is used. However, this is only an example and is not limitative. For example, the face detection may be executed by another method such as a method of detecting a face region focusing on face parts such as eyes, a nose, a and mouth besides a method of detecting a face region through detection of a skin color region.

The feature-point detecting section 13b is a processing section that detects a feature point from a face region. As an example, a feature point is detected from a face region. However, it goes without saying that a feature point may be detected from a head region.

As an embodiment, the feature-point detecting section 13b detects, as a feature point, a corner of a face part from the face region detected by the head detecting section 13a. For such detection of a feature point, as an example, an algorithm of feature point detection proposed by C. Harris and M. Stephens in a literature described below may be used. Besides, it goes without saying that any method such as feature point detection of a features from accelerated segment test (FAST) may be adopted. In the following explanation, the corner of the face part is sometimes described as "corner feature point".

C. Harris and M. Stephens, "A combined corner and edge detector", *Proceedings of the 4th Alvey Vision Conference*, pp. 147 to 151, 1988

The feature-point tracking section 13c is a processing section that tracks a feature point of a face region between image frames.

As an embodiment, the feature-point tracking section 13c calculates a moving vector of a corner feature point between an image frame N in which detection of a corner feature point is executed by the feature-point detecting section 13b and, for example, an image frame N−1, which is an image of an immediately preceding frame. For the calculation of the moving vector of the corner feature point, as an example, an estimation algorithm of an optical flow proposed by B. D. Lucas and T. Kanade in a literature described below may be used. In the example explained above, the tracking of the feature point is performed by calculating the moving vector of the feature point of the face region. However, the tracking of the feature point may be realized by calculating a moving vector of a feature point of a head region.

B. D. Lucas and T. Kanade, "An Iterative Image Registration Technique with an Application to Stereo Vision", in *Proc. of Int Joint Conf. on Artificial Intelligence*, pp. 674 to 679, April, 1981

The motion determining section 13d is a processing section that determines whether a predetermined motion is performed, from time-series data of displacement in the vertical direction of a feature point measured in past image frames traced back.

As an embodiment, every time a moving vector (u, v) of a corner feature point is estimated by the feature-point tracking section 13c, the motion determining section 13d accumulates and adds a vertical component v of the moving vector. The vertical component v of the moving vector corresponds to an amount of vertical change of the corner feature point between an image frame acquired by the acquiring section 11 and an immediately preceding frame of the image frame. Therefore, by accumulating and adding the vertical component v of the moving vector for each image frame, with reference to a position of the corner feature point detected in an image frame in which a face region is detected first, displacement in the vertical direction of the corner feature point from the position is calculated for each image frame. In the following explanation, time-series data of the displacement in the vertical direction concerning the corner feature point included in the face region is described as "displacement waveform".

Every time displacement in the vertical direction of the corner feature point in the present image frame, that is, for example, the latest frame in which an image is acquired by the acquiring section 11 is calculated in this way, the motion determining section 13d determine whether a nodding motion, for example, a motion of lowering and then raising a head is included in a displacement waveform of the corner feature point obtained in past image frames traced back from the present image frame.

For example, the motion determining section 13d determines whether the displacement of the corner feature point in the present image frame is a minimum value. For the determination of the minimum value, as an example, a zero-cross method may be used. That is, for example, the displacement of the corner feature point in the present image frame is a zero-cross point of a differential waveform of the displacement waveform. According to determination concerning whether the displacement is the minimum value between the zero-cross point and an immediately preceding zero-cross point, it is possible to discriminate whether the displacement of the corner feature point in the present image frame is the minimum value. At this time, when the displacement of the corner feature point is the minimum value, the motion determining section 13d determines whether transition of the displacement waveform of the corner feature point is in the order of a minimum value, a maximum value, and a minimum value in time series.

When the transition of the displacement waveform of the corner feature point is in the order of the minimum value, the maximum value, and the minimum value in time series, it is possible to estimate that the nodding motion is performed. In this case, the motion determining section 13d extracts a partial waveform corresponding to the nodding motion in the displacement waveform of the corner feature point, that is, for example, a waveform of a section in which an extreme value transitions in the order of the minimum value, the maximum value, and the minimum value. In the following explanation, the partial waveform corresponding to the nodding motion extracted from the displacement waveform of the corner feature point is sometimes described as "nodding waveform". Then, the motion determining section 13d saves the nodding waveform extracted from the displacement waveform in a work area of a not-illustrated internal memory. In the example explained above, the nodding waveform is extracted from the displacement waveform of the feature point of the face region. However, it goes without saying that the nodding waveform may also be extracted from a displacement waveform of a feature point of the head region.

Figure 3:
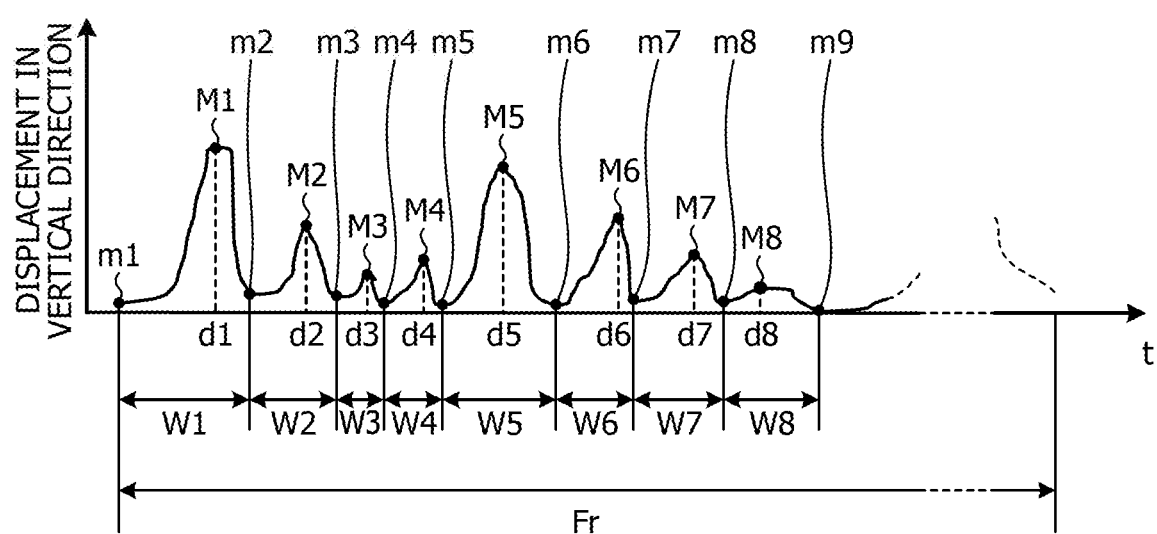
FIG. 3 is a diagram illustrating an example of a displacement waveform of a corner feature point.

FIG. 3 is a diagram illustrating an example of a displacement waveform of a corner feature point. In FIG. 3, a displacement waveform of a corner feature point calculated in an image coordinate system in which an upper left vertex of an image frame is set as an origin is illustrated. In the image coordinate system, an amount of downward change in the vertical direction is measured as positive. On the other hand, an amount of upward change in the vertical direction is measured as negative. A vertical axis illustrated in FIG. 3 indicates displacement in the vertical direction of the corner feature point. A horizontal axis illustrated in FIG. 3 indicates time t. As illustrated in FIG. 3, nodding waveforms W1 to W8 are extracted from the displacement waveform. That is, for example, transition of a minimum value m1, a maximum value M1, and a minimum value m2 is detected at a point in time when the minimum value m2 is detected. As a result, the nodding waveform W1 is extracted from the displacement waveform of the corner feature point. Subsequently, transition of the minimum value m2, a maximum value M2, and a minimum value m3 is detected at a point in time when the minimum value m3 is detected. As a result, the nodding waveform W2 is extracted from the displacement waveform of the corner feature point. Similarly, the nodding waveform W3 in a section including the minimum value m3, a maximum value M3, and a minimum value m4, the nodding waveform W4 in a section including the minimum value m4, a maximum value M4, and a minimum value m5, the nodding waveform W5 in a section including the minimum value m5, a maximum value M5, and a minimum value m6, the nodding waveform W6 in a section including the minimum value m6, a maximum value M6, and a minimum value m7, the nodding waveform W7 in a section including the minimum value m7, a maximum value M7, and a minimum value m8, and the nodding waveform W8 in a section including the minimum value m8, a maximum value M8, and a minimum value m9 are extracted.

The threshold determining section 15 is a processing section that determines a threshold for classifying a nodding depth, which is a peak of a nodding waveform.

The threshold determining section 15 includes, as illustrated in FIG. 1, a depth calculating section 15a, a distribution updating section 15b, a threshold calculating section 15c, and an update-propriety determining section 15d.

The depth calculating section 15a is a processing section that calculates a nodding depth, which is a peak of a nodding waveform.

As an embodiment, the depth calculating section 15a determines whether it is update timing for the threshold. Examples of the update timing for the threshold include timing when the threshold is not set, that is, for example, when the threshold is a NULL value, and timing when a state in which a face region is not detected by the head detecting section 13a shifts to a state in which a face region is detected. At these update timings of the threshold, the depth calculating section 15a starts measurement of the number of frames that elapses from a point in time when the calculation of the threshold is started. That is, for example, the depth calculating section 15a initializes a register that retains the number of measurement frames FrNum to zero and increments a value of the number of measurement frames FrNum by one every time an image frame is acquired thereafter.

After the update of the number of measurement frames FrNum, the depth calculating section 15a calculates, as a nodding depth d, a peak of the nodding waveform saved in the work area of the internal memory by the motion determining section 13d. For example, in the example illustrated in FIG. 3, a peak of the nodding waveform W1 is calculated as a nodding depth d1. Similarly, a nodding depth d2 to a nodding depth d8 are calculated from the nodding waveform W2 to the nodding waveform W8. The calculation of the nodding depth d is not necessarily executed over each frame. In an image frame from which a nodding waveform is not extracted by the motion determining section 13d, a nodding waveform is not saved in the work area of the internal memory. Therefore, the calculation of the nodding depth d is skipped.

The distribution updating section 15b is a processing section that updates a histogram of a nodding depth. The "histogram" referred to herein indicates, as an example, a frequency distribution in which a nodding depth is set as a grade and a frequency of a nodding is set as a frequency.

As an embodiment, every time the nodding depth d is calculated by the depth calculating section 15a, the distribution updating section 15b updates a histogram H1 of a nodding depth saved in the work area of the internal memory. That is, for example, the distribution updating section 15b updates the histogram H1 of the nodding depth by incrementing a frequency corresponding to the nodding depth d calculated by the depth calculating section 15a among frequencies of the histogram H1 of the nodding depth saved in the work area of the internal memory.

The threshold calculating section 15c is a processing section that calculates the threshold.

Figure 4:
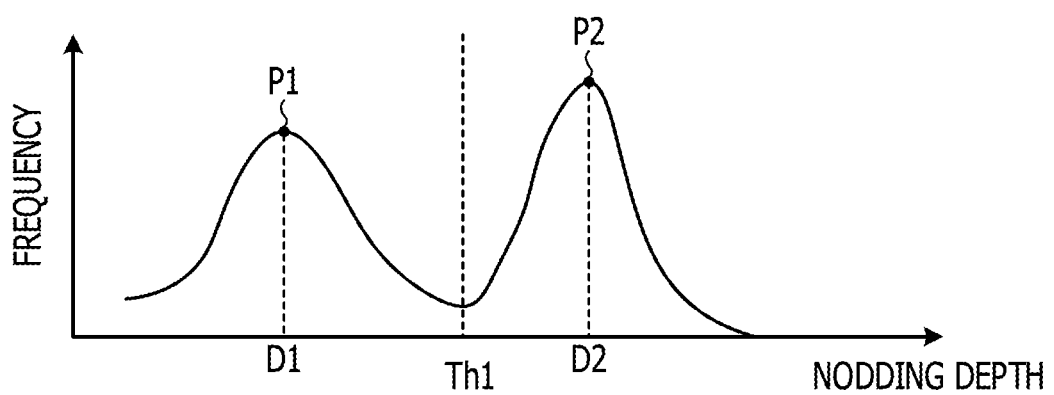
FIG. 4 is a diagram illustrating an example of a histogram of a nodding depth.

As an embodiment, the threshold calculating section 15c determines whether the number of measurement frames FrNum retained in the register is smaller than a specified number of frames Fr, that is, FrNum<Fr. When the number of measurement frames FrNum is not smaller than the specified number of frames Fr, it is seen that the specified number of frames Fr has elapsed from a start of creation of the histogram H1 of the nodding depth. In this case, the threshold calculating section 15c calculates a threshold for classifying the nodding depth based on the histogram H1 of the nodding depth. FIG. 4 is a diagram illustrating an example of the histogram H1 of the nodding depth. A vertical axis illustrated in FIG. 4 indicates a frequency. A horizontal axis illustrated in FIG. 4 indicates a grade, that is, for example, a nodding depth. As illustrated in FIG. 4, the histogram H1 of the nodding depth has a shape having bimodality including two ridges of a distribution corresponding to a shallow nod and a distribution corresponding to a deep nod. This characteristic appears irrespective of a positional relation between the imaging apparatus 5 and the head of the customer, who is the object. Therefore, the threshold calculating section 15c calculates, using a mode method or the like, as a threshold Th1, a threshold that may separate the two ridges, for example, depth of a nod at a minimum value of a trough formed between the two ridges. In the above explanation, only as an example, the depth of the nod at the minimum value of the trough formed between the two ridges of the histogram is set as the threshold Th1. However, the threshold Th1 does not necessarily have to be the depth of the nod at the minimum value. A nodding depth at a frequency within a predetermined range from a minimum value of the trough may also be set as the threshold Th1.

The update-propriety determining section 15d is a processing section that determines propriety of updating the threshold stored in the threshold storing section 17a to the threshold calculated by the threshold calculating section 15c. In the following explanation, in some case, the threshold stored in the threshold storing section 17a is discriminated as "threshold Th0" and the threshold calculated by the threshold calculating section 15c is discriminated as "threshold Th1".

As an embodiment, when the threshold Th1 is calculated by the threshold calculating section 15c, the update-propriety determining section 15d determines whether the threshold Th0 is registered in the threshold storing section 17a, in other words, for example, whether a value of the threshold Th0 is not a NULL value. At this time, when the threshold Th0 is not registered in the threshold storing section 17a, it is seen that propriety of threshold update does not have to be determined. In this case, the update-propriety determining section 15d executes update for overwriting the threshold Th1 calculated by the threshold calculating section 15c with the threshold Th0 stored in the threshold storing section 17a.

On the other hand, when the threshold Th0 is registered in the threshold storing section 17a, the update-propriety determining section 15d calculates, for each of a histogram H0 used for the calculation of the threshold Th0 and the histogram H1 used for the calculation of the threshold Th1, a difference, for example, an absolute value, between a nodding depth corresponding to the first peak and a nodding depth corresponding to a second peak. For example, in the example of the histogram H1 of the nodding depth illustrated in FIG. 4, the update-propriety determining section 15d calculates the absolute value of a difference between a nodding depth D1 corresponding to a first peak P1 and a nodding depth D2 corresponding to a second peak P2, that is, |D1−D2|. Although not illustrated in FIG. 4, in the case of the histogram H0 of the nodding depth, as in the histogram H1 of the nodding depth, it is possible to calculate the difference between the nodding depths of the first peak and the second peak.

Then, the update-propriety determining section 15d determines whether a gap between the difference between the nodding depths of the first peak and the second peak in the histogram H0 of the nodding depth and the difference between the nodding depths of the first peak and the second peak in the histogram H1 of the nodding depth is equal to or larger than a predetermined value. When the gap between the differences is equal to or larger than the predetermined value, it is more likely that a person included in an image frame at a point in time when the threshold Th0 is registered and a person included in an image frame at a point in time when the threshold Th1 is registered are not the same person. In this case, it is more likely that a nod is not accurately classified if the threshold Th0 is used. Therefore, it is more likely that the threshold Th0 is desirably overwritten with the threshold Th1.

Therefore, when the gap is equal to or larger than the threshold, the update-propriety determining section 15d further carries out comparison of an area of the histogram H0 of the nodding depth and an area of the histogram H1 of the nodding depth. That is, for example, the update-propriety determining section 15d determines whether the area of the histogram H1 of the nodding depth is larger than an added-up value obtained by adding a predetermined area α to the area of the histogram H0 of the nodding depth, that is, whether the area of H1>the area of H0+α. At this time, when the area of H1>the area of H0+α, it is more likely that the person included in the image frame at the point in time when the threshold Th0 is registered and the person included in the image frame at the point in time when the threshold Th1 is registered are not the same person. In this case, the update-propriety determining section 15d executes update for overwriting the threshold Th1 calculated by the threshold calculating section 15c with the threshold Th0 stored in the threshold storing section 17a.

On the other hand, when the gap is not equal to or larger than the predetermined value or when the area of the histogram H1 of the nodding depth is not larger than the added-up value obtained by adding the predetermined area α to the area of the histogram H0 of the nodding depth, it is still likely that the person included in the image frame at the point in time when the threshold Th0 is registered and the person included in the image frame at the point in time when the threshold Th1 is registered are the same person. In this case, the overwriting update is not carried out. In the example explained above, the propriety of the threshold update is determined. However, the overwriting update may be unconditionally performed.

The classifying section 17 is a processing section that classifies a nodding motion according to a nodding depth. The classifying section 17 is an example of an evaluating section.

As an embodiment, when it is not the update timing for the threshold, the classifying section 17 reads the threshold Th0 stored in the threshold storing section 17a. Subsequently, the classifying section 17 calculates, as the nodding depth d, a peak of the nodding waveform saved in the work area of the internal memory by the motion determining section 13d. The calculation of the nodding depth d may be realized by the same procedure as the procedure of the depth calculating section 15a. Then, the classifying section 17 determines whether the nodding depth d is equal to or larger than the threshold Th0, that is, d≥Th0. At this time, when the nodding depth d is equal to or larger than the threshold Th0, the classifying section 17 classifies the nodding motion, the nodding depth d of which is calculated, into a "deep nod". On the other hand, when the nodding depth d is not equal to or larger than the threshold Th0, the classifying section 17 classifies the nodding motion, the nodding depth d of which is calculated, into a "shallow nod". Consequently, it is possible to realize classification of nods having different depths. Even when the positional relation between the imaging apparatus 5 and the object is not fixed, it is possible to suppress deterioration in classification accuracy. Such a classification result may be output to a predetermined output destination. For example, an application program for calculating customer satisfaction may be set as an output destination. In this case, the customer satisfaction is calculated using at least one of the number of times of the deep nod and the number of times of the shallow nod. It is possible to support improvement of the quality of customer service by feeding back the customer satisfaction to the store clerk. The application program may operate on the image processing apparatus 10 or may operate on an external apparatus connected to the image processing apparatus 10.

(1) Overall Processing

Figure 5:
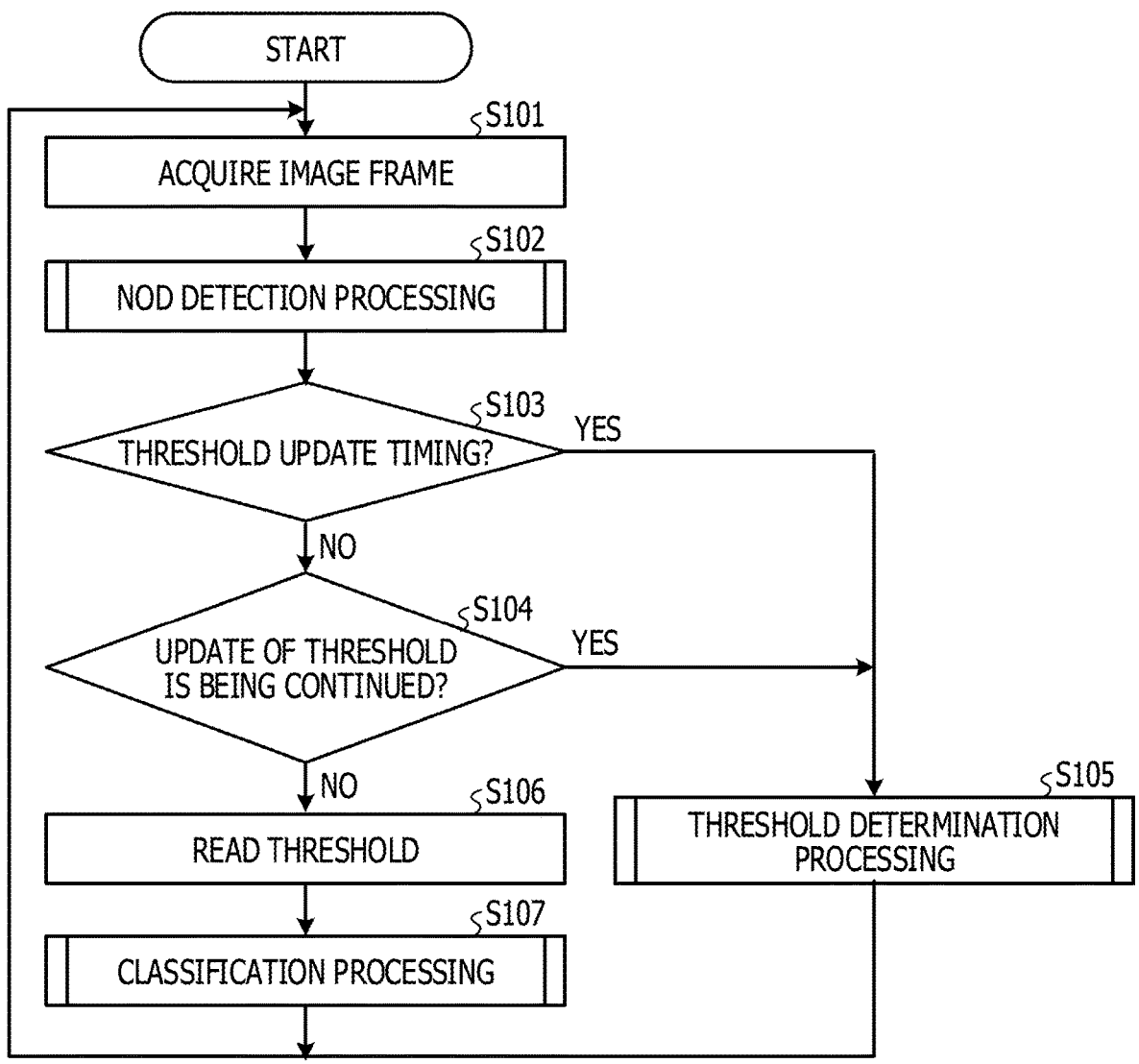
FIG. 5 is a flowchart illustrating a procedure of overall processing according to a first embodiment.

FIG. 5 is a flowchart illustrating a procedure of overall processing according to the first embodiment. As an example, this processing is repeatedly executed while an image frame is supplied from the imaging apparatus 5. As illustrated in FIG. 5, when an image frame is acquired by the acquiring section 11 (step S101), the motion detecting section 13 executes "nod detection processing" for detecting a nodding motion from a series of past image frames traced back from the image frame acquired in step S101 (step S102).

Subsequently, the threshold determining section 15 determines whether it is the update timing for the threshold (step S103). For example, the threshold determining section 15 determines whether any condition is satisfied, for example, the threshold Th0 is not set yet or a state in which a face region is not detected shifts to a state in which a face region is detected. At this time, when it is not the update timing for the threshold (No in step S103), the threshold determining section 15 determines whether the update of the threshold is being continued, for example, whether a specified frame Fr is being measured with the number of measurement frames FrNum (step S104).

At this time, when it is the update timing for the threshold or the update of the threshold is being continued (Yes in step S103 or Yes in step S104), the threshold determining section 15 executes threshold determination processing for determining a threshold for classifying a nodding motion (step S105) and shifts to the processing in step S101.

On the other hand, when it is not the update timing for the threshold and the update of the threshold is not being continued (No in step S103 and No in step S104), the classifying section 17 reads the threshold Th0 stored in the threshold storing section 17a (step S106). Then, the classifying section 17 executes classification processing for classifying a nodding motion into a deep nod or a shallow nod (step S107) and shifts to the processing in step S101.

(2) Nod Detection Processing

Figure 6:
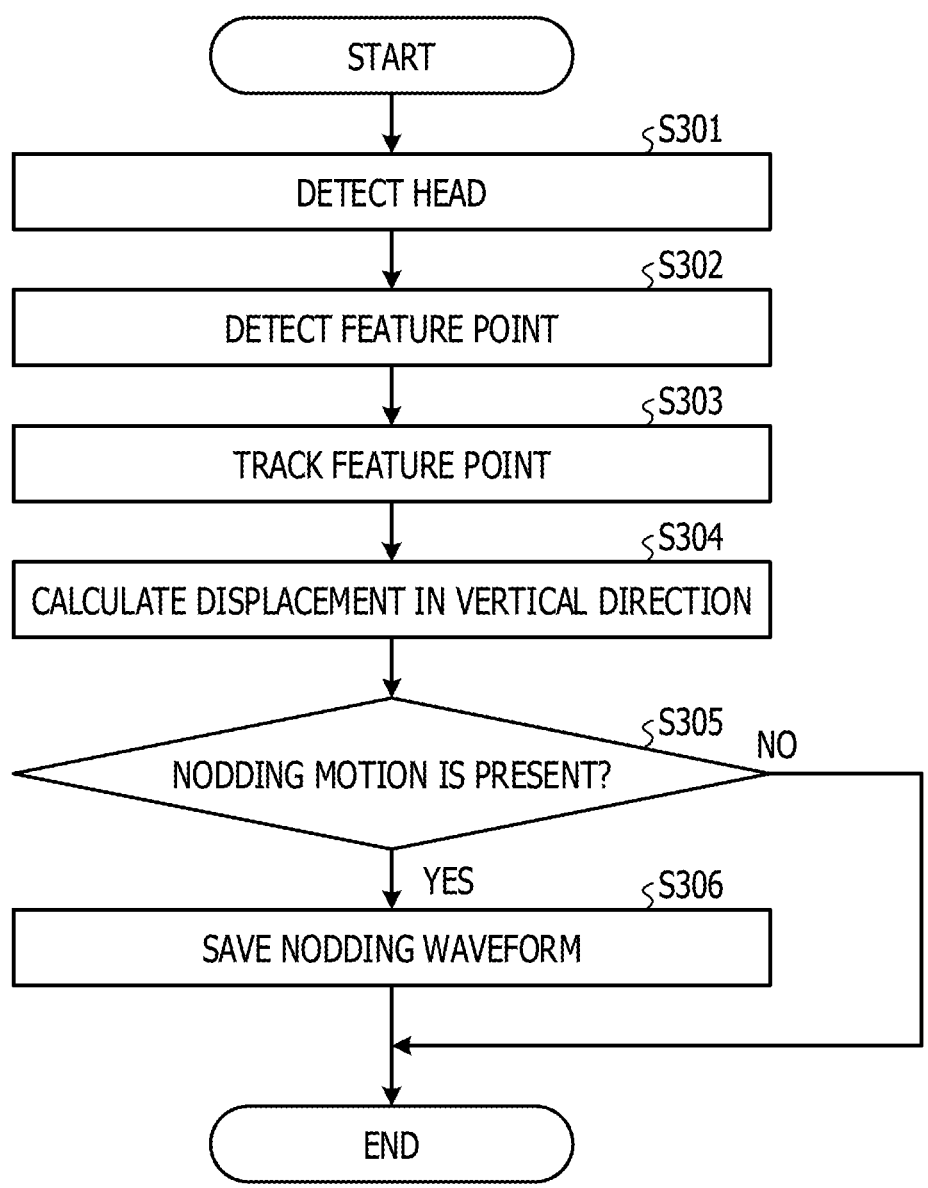
FIG. 6 is a flowchart illustrating a procedure of nod detection processing according to the first embodiment.

FIG. 6 is a flowchart illustrating a procedure of nod detection processing according to the first embodiment. This processing corresponds to the processing in step S102 illustrated in FIG. 5. As illustrated in FIG. 6, the head detecting section 13a detects a face region from the image frame N acquired in step S101 (step S301). Subsequently, the feature-point detecting section 13b detects a corner feature point of a face from the face region detected in step S301 (step S302).

The feature-point tracking section 13c calculates a moving vector of the corner feature point between the image frame N for which the detection of the corner feature point is executed in step S302 and, for example, the image frame N−1, which is an image of an immediately preceding frame (step S303).

Thereafter, the motion determining section 13d further accumulates and adds a vertical component v of the moving vector of the corner feature point calculated in step S303 to a cumulative added-up value to that point (step S304). Consequently, displacement in the vertical direction of the corner feature point in the present image frame, that is, for example, the latest frame in which the image is acquired in step S101.

The motion determining section 13d determines whether a nodding motion, for example, a motion of lowering and then raising a head is included in a displacement waveform of the corner feature point obtained in past image frames traced back from the present image frame (step S305).

At this time, when a nodding motion is detected (Yes in step S305), the motion determining section 13d extracts, as a nodding waveform, a partial waveform corresponding to the nodding motion in the displacement waveform of the corner feature point and then saves the nodding waveform in the work area of the internal memory (step S306) and ends the processing. When a nodding motion is not detected (No in step S305), the motion determining section 13d skips the processing in step S306 and ends the processing.

(3) Threshold Determination Processing

Figure 7:
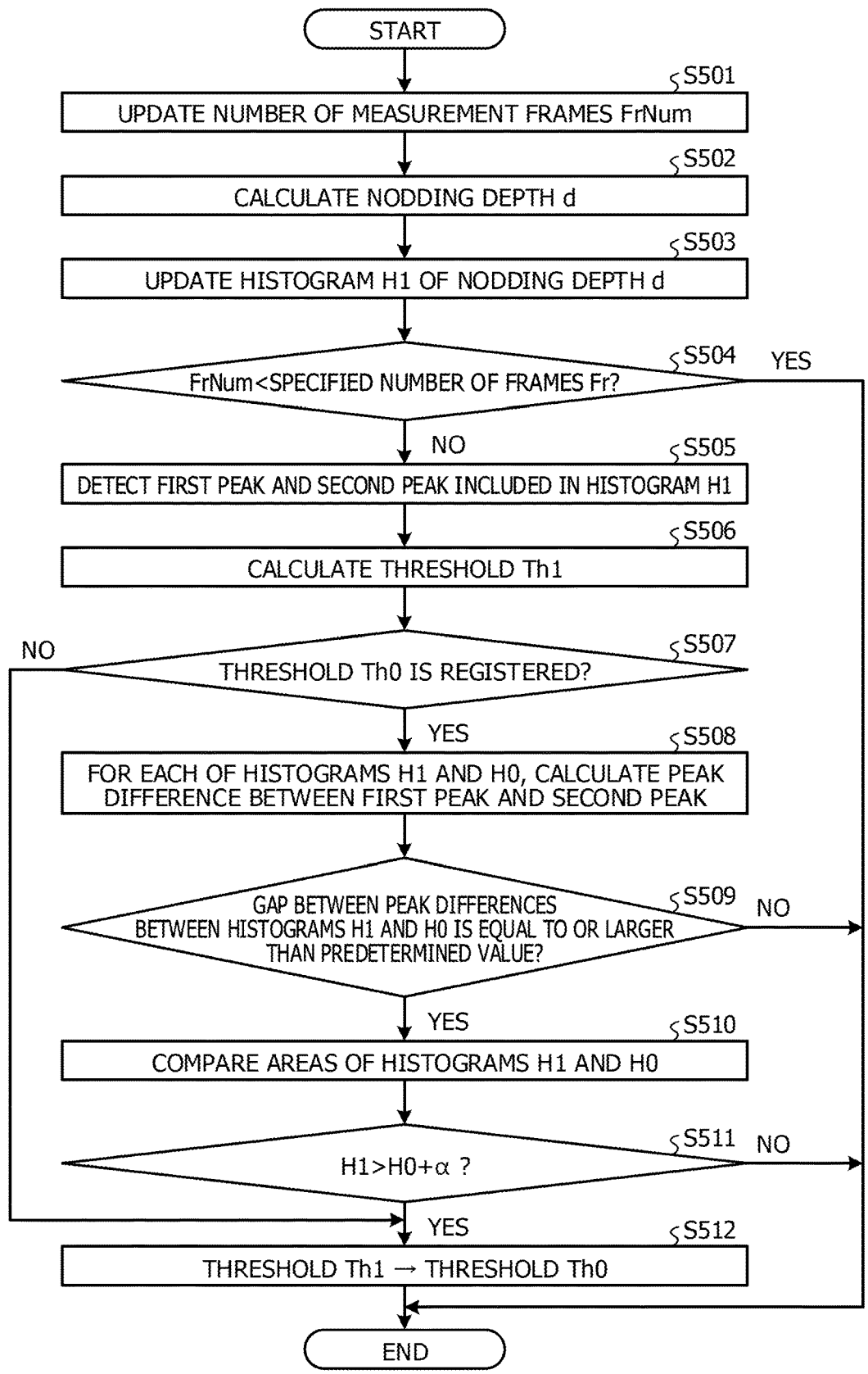
FIG. 7 is a flowchart illustrating a procedure of threshold determination processing according to the first embodiment.

FIG. 7 is a flowchart illustrating a procedure of threshold determination processing according to the first embodiment.

This processing corresponds to the processing in step S105 illustrated in FIG. 5. As illustrated in FIG. 7, the depth calculating section 15a updates the number of measurement frames FrNum retained in the register (step S501). For example, at timing when the update of the threshold is started, a value of the number of measurement frames FrNum retained in the register is initialized. When the update of the threshold is being continued, the value of the number of measurement frames FrNum retained in the register is incremented by one.

Subsequently, the depth calculating section 15a calculates, as the nodding depth d, a peak of the nodding waveform saved in the work area of the internal memory by the motion determining section 13d (step S502). The processing in step S502 is not necessarily executed over each frame. That is, for example, when the processing in step S306 illustrated in FIG. 6 is skipped, since the nodding waveform is not saved in the work area of the internal memory, the processing in step S502 is skipped.

The distribution updating section 15b updates the histogram H1 of the nodding depth by incrementing a frequency corresponding to the nodding depth d calculated in step S502 among frequencies of the histogram H1 of the nodding depth saved in the work area of the internal memory (step S503).

Subsequently, the threshold calculating section 15c determines whether the number of measurement frames FrNum retained in the register is smaller than the specified number of frames Fr, that is, whether FrNum<Fr (step S504). When the number of measurement frames FrNum is smaller than the specified number of frames Fr (Yes in step S504), the threshold calculating section 15c skips the following processing and ends the processing.

On the other hand, when the number of measurement frames FrNum is not smaller than the specified number of frames Fr (No in step S504), it is seen that the specified number of frames Fr has elapsed from a start of creation of the histogram H1 of the nodding depth. In this case, the threshold calculating section 15c detects a first peak and a second peak included in the histogram H1 of the nodding depth (step S505). Then, the threshold calculating section 15c calculates, according to the mode method or the like, as the threshold Th1, a threshold that may separate two ridges of the first peak and the second peak, for example, depth of a nod at a minimum value of a trough formed between the two ridges (step S506).

Subsequently, the update-propriety determining section 15d determines whether the threshold Th0 is registered in the threshold storing section 17a, in other words, for example, whether a value of the threshold Th0 is not a NULL value (step S507). At this time, when the threshold Th0 is registered in the threshold storing section 17a (Yes in step S507), the update-propriety determining section 15d calculates, for each of the histogram H0 used for the calculation of the threshold Th0 and the histogram H1 used for the calculation of the threshold Th1, a difference between a nodding depth corresponding to the first peak and a nodding depth corresponding to the second peak (step S508).

Then, the update-propriety determining section 15d determines whether a gap between the difference between the nodding depths of the first peak and the second peak in the histogram H0 of the nodding depth and the difference between the nodding depths of the first peak and the second peak in the histogram H1 of the nodding depth is equal to or larger than a predetermined value (step S509).

When the gap between the differences is equal to or larger than the predetermined value (Yes in step S509), it is more likely that a person included in an image frame at a point in time when the threshold Th0 is registered and a person included in an image frame at a point in time when the threshold Th1 is registered are not the same person. In this case, it is more likely that a nod is not accurately classified if the threshold Th0 is used. Therefore, it is more likely that the threshold Th0 is desirably overwritten with the threshold Th1. Therefore, the update-propriety determining section 15d further performs comparison of an area of the histogram H0 of the nodding depth and an area of the histogram H1 of the nodding depth (step S510).

When the area of the histogram H1 of the nodding depth is larger than an added-up value obtained by adding a predetermined area α to the area of the histogram H0 of the nodding depth, that is, the area of H1>the area of H0+α (Yes in step S511), it is more likely that the person included in the image frame at the point in time when the threshold Th0 is registered and the person included in the image frame at the point in time when the threshold Th1 is registered are not the same person. In this case, the update-propriety determining section 15d executes update for overwriting the threshold Th1 calculated in step S506 with the threshold Th0 stored in the threshold storing section 17a (step S512) and ends the processing.

On the other hand, when the gap is not equal to or larger than the predetermined value or when the area of the histogram H1 of the nodding depth is not larger than the added-up value obtained by adding the predetermined area α to the area of the histogram H0 of the nodding depth (No in step S509 or No in step S511), it is still likely that the person included in the image frame at the point in time when the threshold Th0 is registered and the person included in the image frame at the point in time when the threshold Th1 is registered are the same person. In this case, the overwriting update in step S512 is not carried out. The processing directly ends.

When the threshold Th0 is not registered in the threshold storing section 17a (No in step S507), it is seen that propriety of threshold update does not have to be determined. In this case, the update-propriety determining section 15d executes update for overwriting the threshold Th1 calculated in step S506 with the threshold Th0 stored in the threshold storing section 17a (step S512) and ends the processing.

(4) Classification Processing

Figure 8:
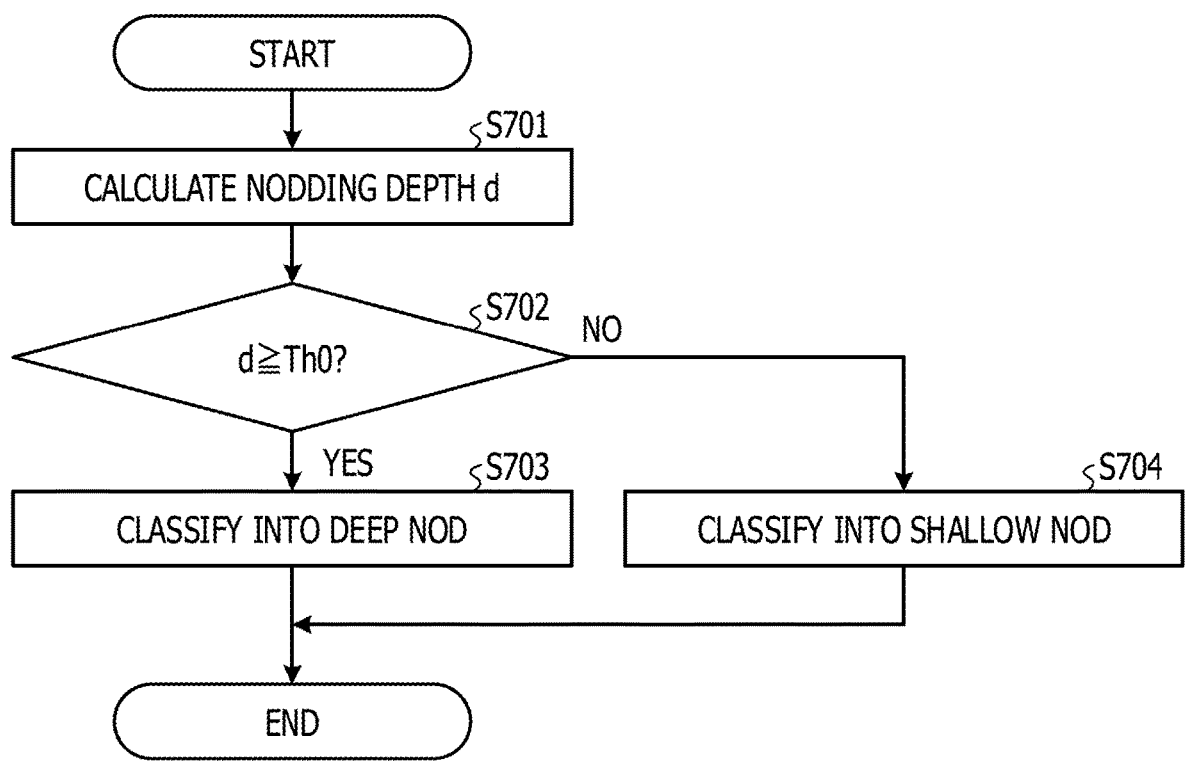
FIG. 8 is a flowchart illustrating a procedure of classification processing according to the first embodiment.

FIG. 8 is a flowchart illustrating a procedure of classification processing according to the first embodiment. This processing corresponds to the processing in step S107 illustrated in FIG. 5. As illustrated in FIG. 8, the classifying section 17 calculates, as the nodding depth d, a peak of the nodding waveform saved in the work area of the internal memory by the motion determining section 13d (step S701).

Then, the classifying section 17 determines whether the nodding depth d calculated in step S701 is equal to or larger than the threshold Th0, that is, whether d≥Th0 (step S702). At this time, when the nodding depth d is equal to or larger than the threshold Th0 (Yes in step S702), the classifying section 17 classifies the nodding motion, the nodding depth d of which is calculated, to a "deep nod" (step S703) and ends the processing. On the other hand, when the nodding depth d is not equal to or larger than the threshold Th0 (No in step S702), the classifying section 17 classifies the nodding motion, the nodding depth d of which is calculated, into a "shallow nod" (step S704) and ends the processing.

One Aspect of an Effect of the First Embodiment

As explained above, the image processing apparatus 10 according to this embodiment determines, based on the frequency distribution of the depth of the nod detected from the image frame captured by the imaging apparatus 5, the threshold for classifying the depth of the nod detected from the image frame into the shallow nod and the deep nod. That is, for example, even when the positional relation between the imaging apparatus 5 and the head of the customer, who is the object, changes, the frequency distribution of the depth of the nod has the shape having the bimodality including the two ridges of the distribution corresponding to the shallow nod and the distribution corresponding to the deep nod. Therefore, by using, as an example of the threshold, a threshold that may separate the two ridges, for example, depth of a nod in a trough portion formed between the two ridges, it is possible to determine a threshold that may classify the shallow nod and the deep nod irrespective of the positional relation between the imaging apparatus 5 and the object. Therefore, with the image processing apparatus 10 according to this embodiment, it is possible to classify nods having different depths. With the image processing apparatus 10 according to this embodiment, even when the positional relation between the imaging apparatus 5 and the object is not fixed, it is possible to suppress deterioration in classification accuracy.

Second Embodiment

In the example explained in the first embodiment, one threshold Th0 for classifying a nodding motion is used. However, a plurality of thresholds may also be adaptively switched and used. Therefore, in a second embodiment, an example is explained in which a threshold Th0A for a short distance and a threshold Th0B for a long distance are switched and used for classification of a nodding motion according to whether the distance between the imaging apparatus 5 and the object is a short distance or a long distance.

[System Configuration]

Figure 9:
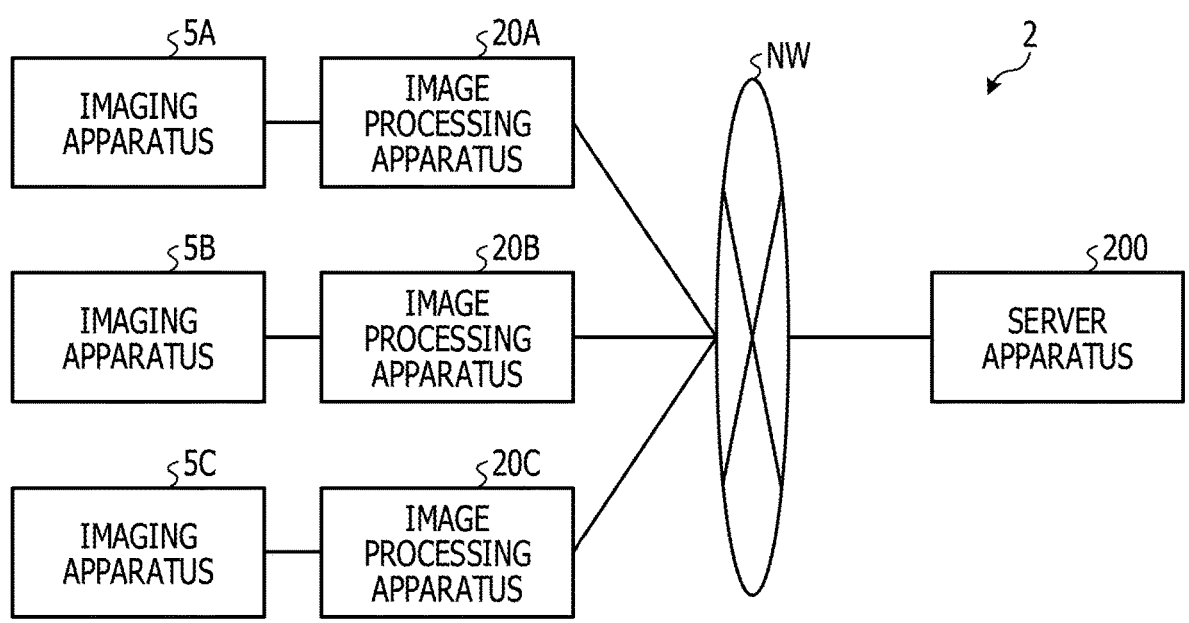
FIG. 9 is a diagram illustrating a configuration example of an image processing system according to a second embodiment.

FIG. 9 is a diagram illustrating a configuration example of an image processing system according to the second embodiment. An image processing system 2 illustrated in FIG. 9 includes imaging apparatuses 5A to 5C, image processing apparatuses 20A to 20C, and a server apparatus 200. In the following explanation, in some case, the imaging apparatuses 5A to 5C are collectively referred to as "imaging apparatus 5" and the image processing apparatuses 20A to 20C are collectively referred to as "image processing apparatus 20".

As illustrated in FIG. 9, the imaging apparatus 5 is connected to the image processing apparatus 20. The image processing apparatus 20 and the server apparatus 200 are communicably connected to each other via a network NW. As the network NW, a communication network of any type such as the Internet, a local area network (LAN), or a virtual private network (VPN) may be adopted irrespective of whether the communication network is a wired network or a wireless network.

Figure 10:
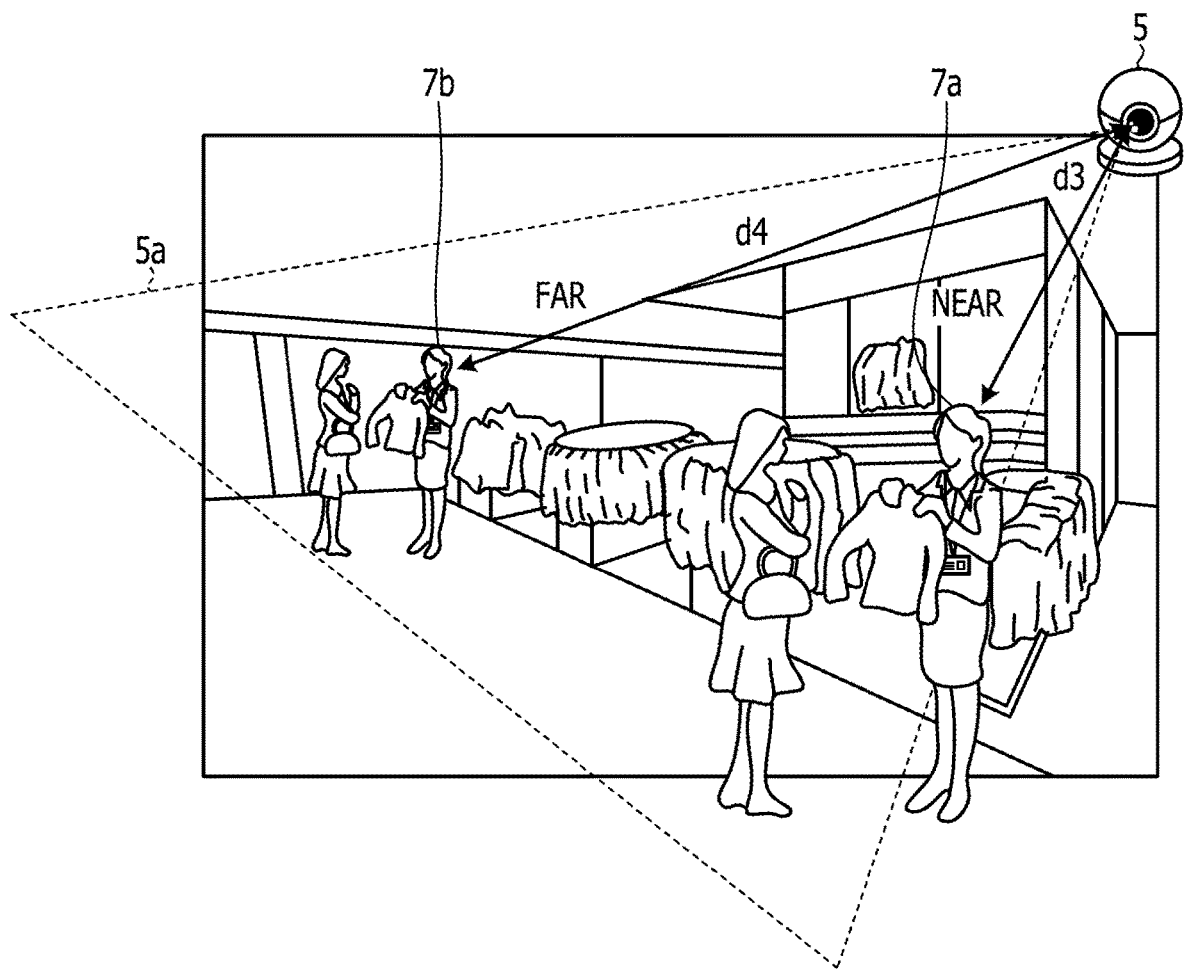
FIG. 10 is a diagram illustrating another example of the use case.

Subsequently, a use case according to this embodiment is explained. FIG. 10 is a diagram illustrating another example of the use case. In FIG. 10, a scene is illustrated in which, as preprocessing of evaluation of customer satisfaction with customer service by a store clerk belonging to a selling area of an apparel shop, a nod of the store clerk detected from an image captured by the imaging apparatus 5 is classified. Even in the scene in which the nod of the store clerk is classified in this way, as in the use case illustrated in FIG. 2, that is, for example, the classification of the nod of the customer is classified, a positional relation between the imaging apparatus 5 and the head of the store clerk, who is an object, is not fixed. For example, in some cases, customer service is performed in a positional relation in which the distance between the imaging apparatus 5 and a head 7*a* of a store clerk is d3 and, in other cases, customer service is performed in a positional relation in which the distance between the imaging apparatus 5 and a head 7*b* of a store clerk is d4. If the positional relations are different in this way, even when a nod having the same depth is performed, a difference occurs in an amount of vertical change of the head appearing in an image frame. That is, for example, even when a nod having the same depth is performed, an amount of vertical change of the head appearing in the image frame in a near positional relation is larger than an amount of vertical change appearing in the image frame in a far positional relation.

Therefore, the image processing apparatus 20 according to this embodiment appropriately determines a threshold for classifying a deep nod and a shallow nod in the same approach as the approach in the first embodiment and, in addition, switches the threshold Th0A for a short distance and the threshold Th0B for a long distance and use the threshold Th0A and the threshold Th0B for classification of a nodding motion according to whether the distance between the imaging apparatus 5 and the object is a short distance or a long distance.

Referring back to FIG. 9, the server apparatus 200 is a computer that provides an evaluation service for performing a service evaluation of a store clerk from a classification result of a nodding motion.

As an embodiment, the server apparatus 200 may be implemented by installing, as package software or online software, in a desired computer, an evaluation program for realizing the evaluation service. For example, the server apparatus 200 may be implemented as a Web server that provides the evaluation service or may be implemented as a cloud that provides the evaluation service through outsourcing.

For example, the server apparatus 200 collects the number of times of a deep nod and the number of times of a shallow nod, as an example of a classification result of the nodding motion, from the image processing apparatus 20. When the number of times of the deep nod and the number of times of the shallow nod are collected in this way, the server apparatus 200 calculates an evaluation value for evaluating service quality of the store clerk from the number of times of the deep nod and the number of times of the shallow nod. For example, as a frequency of the deep nod is higher, the server apparatus 200 may evaluate that the store clerk understands a topic uttered by a customer and communicates the understanding to the customer. Therefore, the server apparatus 200 calculates the evaluation value higher. As a frequency of the shallow nod is higher, the server apparatus 200 may evaluate that the store clerk listens to speech of the customer without interrupting utterance of the customer. Therefore, the server apparatus 200 calculates the evaluation value higher. Nevertheless, if the frequency of the shallow nod is too high, a feeling of slyness is given to the customer. Therefore, it is also possible to set an upper limit value of the frequency of the shallow nod and, when the frequency of the shallow nod exceeds the upper limit value, reduce the evaluation value according to a stage when the frequency of the shallow nod exceeds the upper limit value. After the evaluation value concerning the service quality of the store clerk is calculated in this way, the server apparatus 200 transmits the evaluation value concerning the service quality of the store clerk to the image processing apparatus 20 that collects the classification result. Consequently, it is possible to support an administrator or the like of the store clerk to evaluate the performance of the store clerk and support the administrator of the store clerk to direct a service attitude of the store clerk.

[Configuration of the Image Processing Apparatus 20]

Figure 11:
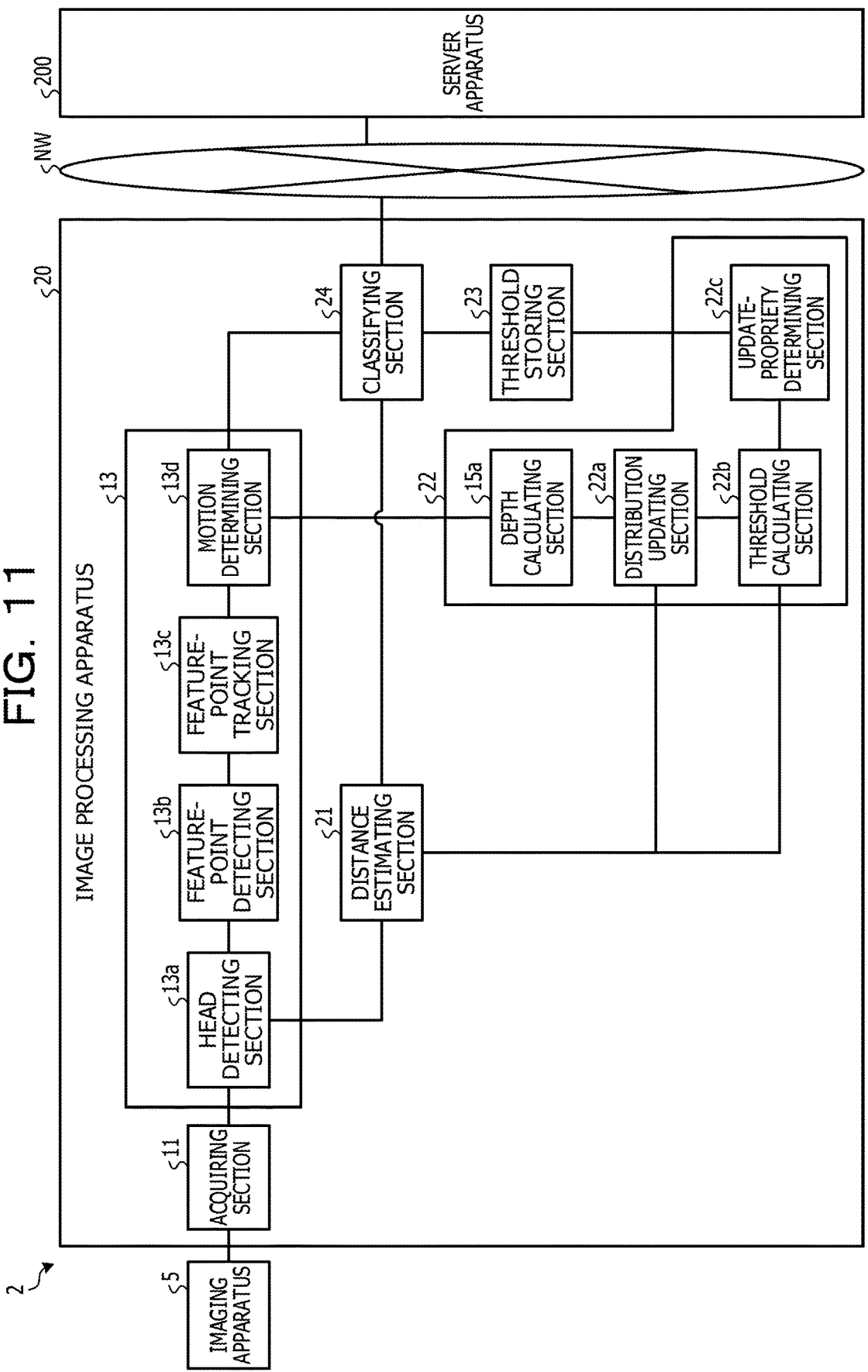
FIG. 11 is a block diagram illustrating a functional configuration of an image processing apparatus according to a second embodiment.

FIG. 11 is a block diagram illustrating a functional configuration of the image processing apparatus 20 according to the second embodiment. In FIG. 11, functional sections that exert the same functions as the functional sections in the first embodiment are denoted by the same reference numerals and signs. On the other hand, functional sections added to FIG. 1 and functional sections having partially different functions are denoted by different reference numerals and signs. Therefore, in the following explanation, importance is placed on explanation of the functional sections denoted by the different reference numerals and signs. On the other hand, explanation of the functional sections denoted by the same reference numerals and signs is omitted.

As illustrated in FIG. 11, the image processing apparatus 20 is different from the image processing apparatus 10 illustrated in FIG. 1 in that the image processing apparatus 20 further includes a distance estimating section 21 and a part of functions of a threshold determining section 22 and a classifying section 24 is different.

The distance estimating section 21 is a processing section that estimates a distance between the imaging apparatus 5 and an object set as a detection target of a nod.

As an embodiment, the distance estimating section 21 executes processing explained below every time a face region is detected by the head detecting section 13*a*. That is, for example, the distance estimating section 21 counts the number of pixels A of the face region detected by the head detecting section 13*a*. At this time, the distance estimating section 21 may also measure the number of pixels A targeting pixels having a color corresponding to a skin color among pixels included in the face region. Then, the distance estimating section 21 calculates, from the number of pixels A of the face region, a distance D between the imaging apparatus 5 and the face region, which is an object. For example, the distance estimating section 21 calculates the distance D classified into two values of a short distance "0" and a long distance "1" according to whether a value obtained by dividing the number of pixels A of the face region by a total number of pixels of an image frame, that is, "the number of pixels A of the face region/the total number of pixels of the image frame" is equal to or smaller than a predetermined value, for example, "0.2". That is, for example, when the number of pixels A of the face region/the total number of pixels of the image frame is equal to or larger than the predetermined value, it is seen that a ratio of the number of pixels A of the face region is relatively large compared with when the number of pixels A of the face region/the total number of pixels of the image frame is smaller than the predetermined value. In this case, the distance D is classified into the short distance "0". On the other hand, when the number of pixels A of the face region/the total number of pixels of the image frame is smaller than the predetermined value, it is seen that the ratio of the number of pixels A of the face region is relatively small compared with when the number of pixels A of the face region/the total number of pixels of the image frame is equal to or larger than the predetermined value. In this case, the distance D is classified into the long distance "1". Then, the distance estimating section 21 outputs the distance D to the imaging apparatus 5 to functional sections in a post stage, that is, for example, a distribution updating section 22*a*, a threshold calculating section 22*b*, and the classifying section 24. In the example explained above, the distance D is calculated from the number of pixels of the face region. However, the distance D may be calculated from the number of pixels of a head region as well.

The distribution updating section 22*a* is different from the distribution updating section 15*b* illustrated in FIG. 1 in that the distribution updating section 22*a* switches, according to whether the distance D estimated by the distance estimating section 21 is the short distance "0" or the long distance "1", a histogram to be updated. That is, for example, when the distance D is the short distance "0", the distribution updating section 22*a* updates a histogram H1A for a short distance. On the other hand, when the distance D is the long distance "1", the distribution updating section 22*a* updates a histogram H1B for a long distance.

The threshold calculating section 22*b* is different from the threshold calculating section 15*c* illustrated in FIG. 1 in that the threshold calculating section 22*b* switches, according to whether the distance D estimated by the distance estimating section 21 is the short distance "0" or the long distance "1", a histogram used for threshold calculation. That is, for example, when the distance D is the short distance "0", the threshold calculating section 22*b* calculates a threshold Th1A for a short distance from the histogram H1A for the short distance. On the other hand, when the distance D is the long distance "1", the threshold calculating section 22*b* calculates a threshold Th1B for a long distance from the histogram H1B for the long distance.

An update-propriety determining section 22*c* is different from the update-propriety determining section 15*d* illustrated in FIG. 1 in that the update-propriety determining section 22*c* switches, according to whether the distance D estimated by the distance estimating section 21 is the short distance "0" or the long distance "1", a threshold for determining propriety of overwrite. That is, for example, when the distance D is the short distance "0", the update-propriety determining section 22*c* determines whether to overwrite the threshold Th0A with the threshold Th1A. On the other hand, when the distance D is the long distance "1", the threshold calculating section 22*b* determines whether to overwrite the threshold Th0B with the threshold Th1B.

The classifying section 24 is different from the threshold calculating section 15*c* illustrated in FIG. 1 in that the classifying section 24 switches, according to whether the distance D estimated by the distance estimating section 21 is the short distance "0" or the long distance "1", a threshold to be read when classification of a nodding motion is performed. That is, for example, when the distance D is the short distance "0", the classifying section 24 reads the threshold Th0A from a threshold storing section 23. On the other hand, when the distance D is the long distance "1", the classifying section 24 reads the threshold Th0B from the threshold storing section 23.

Figure 12:
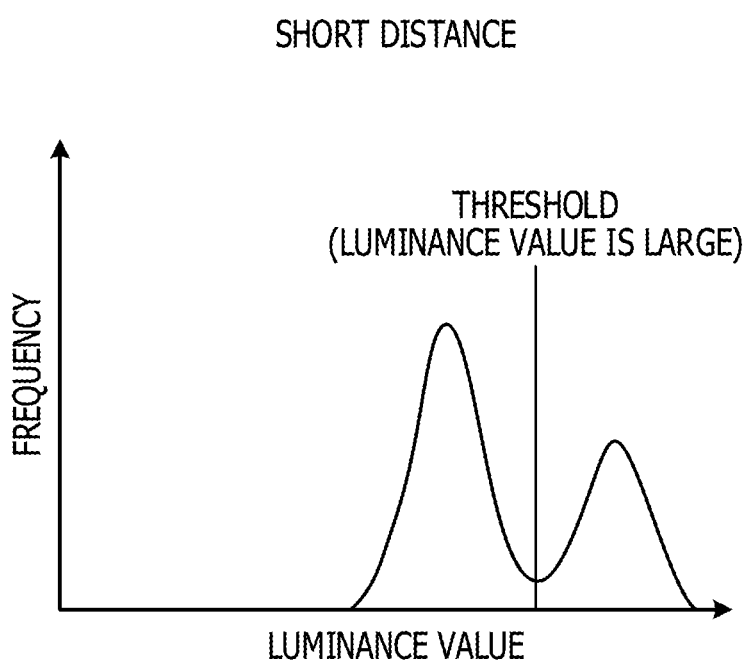
FIG. 12 is a diagram illustrating an example of a histogram of a nodding depth.
Figure 13:
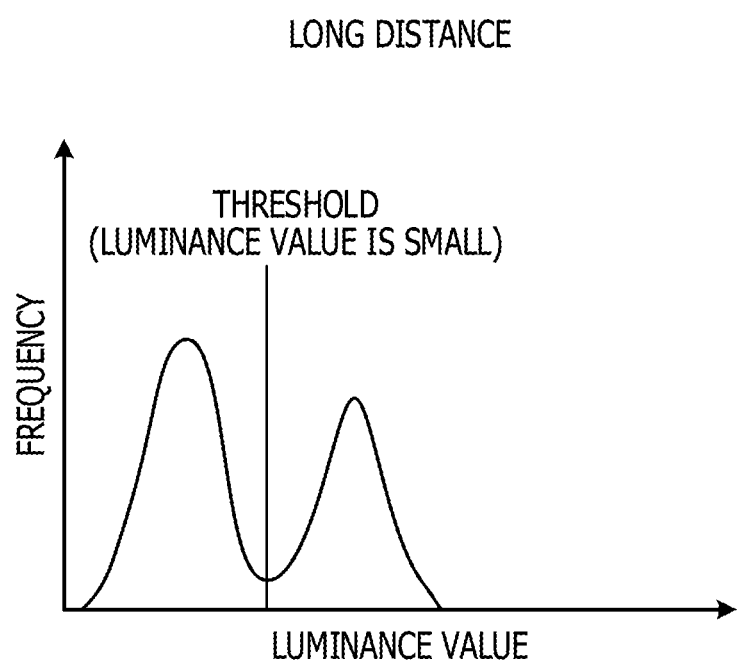
FIG. 13 is a diagram illustrating an example of a histogram of a nodding depth.

The threshold storing section 23 illustrated in FIG. 11 is different from the threshold storing section 17*a* illustrated in FIG. 1 in that two thresholds of the threshold Th0A for the short distance and the threshold Th0B for the long distance are stored in the threshold storing section 23. FIGS. 12 and 13 are diagrams illustrating examples of histograms of a nodding depth. In FIG. 12, the histogram H1A for the short distance is illustrated. On the other hand, in FIG. 13, the histogram H1B for the long distance is illustrated. When FIGS. 12 and 13 are compared, in the histogram H1A for the short distance, compared with the histogram H1B for the long distance, an entire distribution including a first peak and a second peak is closer to the right. On the other hand, in the histogram H1B for the long distance, compared with the histogram H1A for the short distance, an entire distribution including a first peak and a second peak is closer to the left. Therefore, it is seen that the threshold Th1A calculated from the histogram H1A for the short distance is highly likely to be larger than the threshold Th1B calculated from the histogram H1B for the long distance.

(1) Distance Estimation Processing

Figure 14:
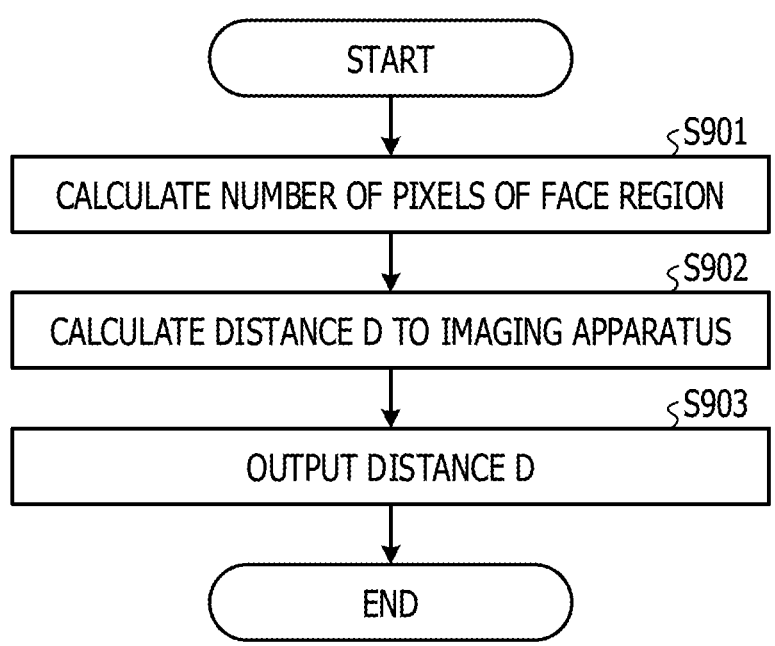
FIG. 14 is a flowchart illustrating a procedure of distance estimation processing according to the second embodiment.

FIG. 14 is a flowchart illustrating a procedure of distance estimation processing according to the second embodiment. As an example, this processing is processing executed after the face region is detected in step S301 illustrated in FIG. 6. The processing may be executed in parallel to the nod detection processing illustrated in FIG. 6.

As illustrated in FIG. 14, the distance estimating section 21 counts the number of pixels A of the face region detected by the head detecting section 13a (step S901). At this time, the distance estimating section 21 may also measure the number of pixels A targeting pixels having a color corresponding to a skin color among pixels included in the face region.

Then, the distance estimating section 21 calculates the distance D between the imaging apparatus 5 and the face region, which is an object, from the number of pixels A of the face region counted in step S901 (step S902). For example, when the number of pixels A of the face region/the total number of pixels of the image frame is equal to or large than the predetermined value, the distance estimating section 21 estimates the distance D to the imaging apparatus 5 as the short distance "0". On the other hand, when the number of pixels A of the face region/the total number of pixels of the image frame is smaller than the predetermined value, the distance estimating section 21 estimates the distance D to the imaging apparatus 5 as the long distance "1".

Thereafter, the distance estimating section 21 outputs the distance D to the imaging apparatus 5 estimated in step S902 to functional sections in a post stage, that is, for example, the distribution updating section 22a, the threshold calculating section 22b, and the classifying section 24 (step S903) and ends the processing.

(2) Threshold Determination Processing

Figure 15B:
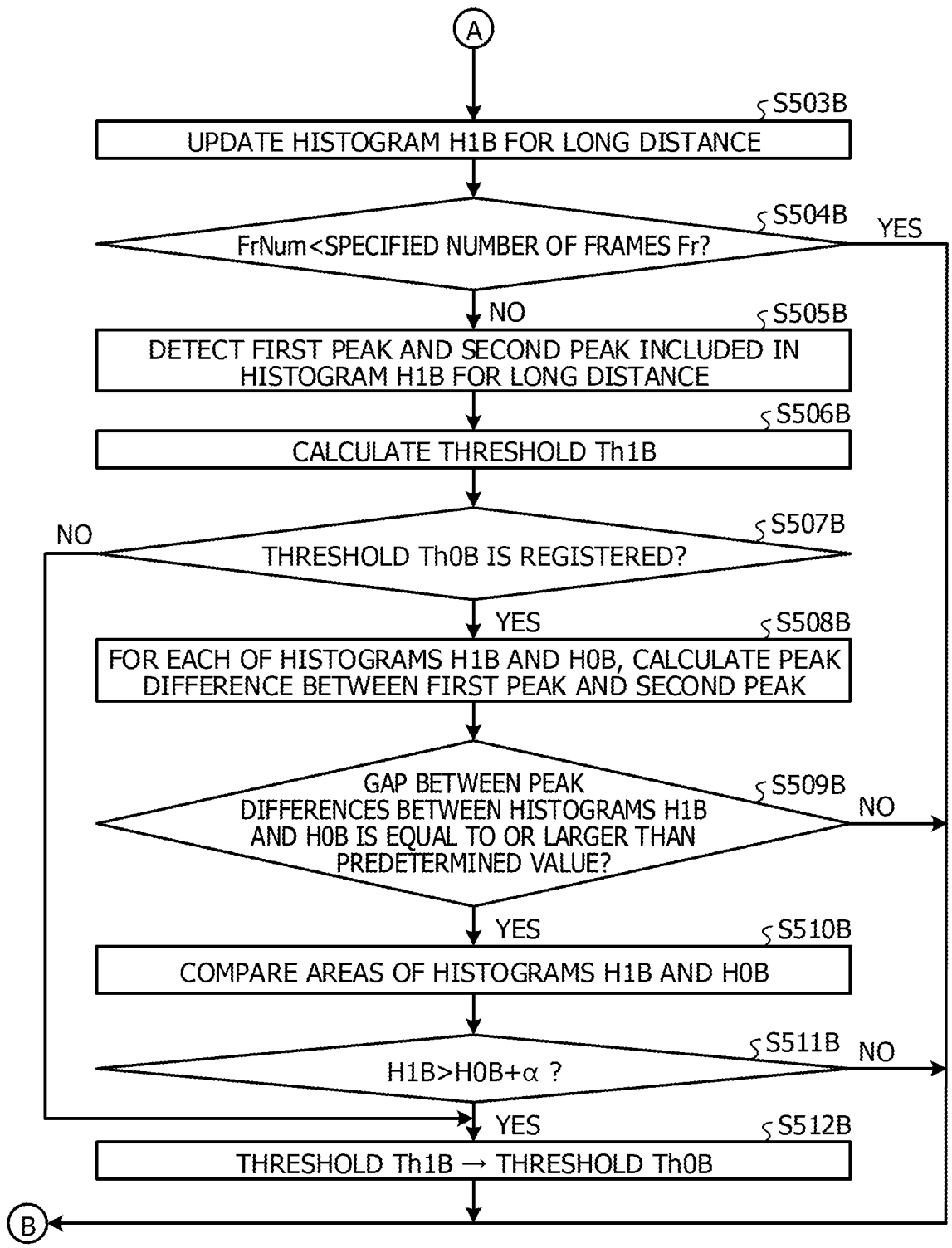

FIG. 15 (i.e., FIGS. 15A and 15B) is a flowchart illustrating a procedure of threshold determination processing according to the second embodiment. This processing may be executed instead of the processing illustrated in FIG. 7. As illustrated in FIG. 15, the depth calculating section 15a updates the number of measurement frames FrNum retained in the register (step S501). For example, at timing when the update of the threshold is started, a value of the number of measurement frames FrNum retained in the register is initialized. When the update of the threshold is being continued, the value of the number of measurement frames FrNum retained in the register is incremented by one.

Subsequently, the depth calculating section 15a calculates, as the nodding depth d, a peak of the nodding waveform saved in the work area of the internal memory by the motion determining section 13d (step S502). The processing in step S502 is not necessarily executed over each frame. That is, for example, when the processing in step S306 illustrated in FIG. 6 is skipped, the nodding waveform is not saved in the work area of the internal memory. Therefore, the processing in step S502 is skipped.

Processing after step S502 branches according to whether the distance D to the imaging apparatus 5 estimated in step S902 illustrated in FIG. 14 is the short distance "0" or the long distance "1". In the following explanation, "A" is added to the ends of step numbers of the processing branching to the short distance "0" and, on the other hand, "B" is added to the ends of step numbers of the processing branching to the long distance "1" to individually explain the respective kinds of processing.

(2.1) Branch A

For example, when the distance D to the imaging apparatus 5 is the short distance "0" (Yes in step S1101), the distribution updating section 22a updates the histogram H1A of the nodding depth for the short distance by incrementing a frequency corresponding to the nodding depth d calculated in step S502 among the frequencies of the histogram H1A of the nodding depth saved in the work area of the internal memory (step S503A).

Subsequently, the threshold calculating section 22b determines whether the number of measurement frames FrNum retained in the register is smaller than the specified number of frames Fr, that is, FrNum<Fr (step S504A). When the number of measurement frames FrNum is smaller than the specified number of frames Fr (Yes in step S504A), the threshold calculating section 22b skips the following processing and ends the processing.

On the other hand, when the number of measurement frames FrNum is not smaller than the specified number of frames Fr (No in step S504A), it is seen that the specified number of frames Fr has elapsed from a start of the creation of the histogram H1A of the nodding depth for the short distance. In this case, the threshold calculating section 22b detects a first peak and a second peak included in the histogram H1A of the nodding depth for the short distance (step S505A). Then, the threshold calculating section 22b calculates, according to the mode method or the like, as the threshold Th1A, a threshold that may separate two ridges of the first peak and the second peak, for example, depth of a nod at a minimum value of a trough formed between the two ridges (step S506A).

Subsequently, the update-propriety determining section 22c determines whether the threshold Th0A is registered in the threshold storing section 23, in other words, for example, whether a value of the threshold Th0A is not a NULL value (step S507A). At this time, when the threshold Th0A is registered in the threshold storing section 23 (Yes in step S507A), the update-propriety determining section 22c calculates, for each of a histogram H0A used for the calculation of the threshold Th0A and a histogram H1A used for the calculation of the threshold Th1A, a difference between a nodding depth corresponding to the first peak and a nodding depth corresponding to the second peak (step S508A).

Then, the update-propriety determining section 22c determines whether a gap between the difference between the nodding depths of the first peak and the second peak in the histogram H0A of the nodding depth and the difference between the nodding depths of the first peak and the second peak in the histogram H1A of the nodding depth is equal to or larger than a predetermined value (step S509A).

When the gap between the differences is equal to or larger than the predetermined value (Yes in step S509A), it is more likely that a person included in an image frame at a point in time when the threshold Th0A is registered and a person included in an image frame at a point in time when the threshold Th1A is registered are not the same person. In this case, it is more likely that a nod is not accurately classified if the threshold Th0A is used. Therefore, it is more likely that the threshold Th0A is desirably overwritten with the threshold Th1A. Therefore, the update-propriety determining section 22c further performs comparison of an area of the histogram H0A of the nodding depth and an area of the histogram H1A of the nodding depth (step S510A).

When the area of the histogram H1A of the nodding depth is larger than an added-up value obtained by adding a predetermined area α to the area of the histogram H0A of the nodding depth, that is, the area of H1A>the area of H0A+α (Yes in step S511A), it is more likely that the person included in the image frame at the point in time when the threshold Th0A is registered and the person included in the image frame at the point in time when the threshold Th1A is registered are not the same person. In this case, the update-propriety determining section 22c executes update for overwriting the threshold Th1A calculated in step S506A with the threshold Th0A stored in the threshold storing section 23 (step S512A) and ends the processing.

On the other hand, when the gap is not equal to or larger than the predetermined value or when the area of the histogram H1A of the nodding depth is not larger than the added-up value obtained by adding the predetermined area α to the area of the histogram H0A of the nodding depth (No in step S509A or No in step S511A), it is still likely that the person included in the image frame at the point in time when the threshold Th0A is registered and the person included in the image frame at the point in time when the threshold Th1A is registered are the same person. In this case, the overwriting update in step S512A is not carried out. The processing directly ends.

When the threshold Th0A is not registered in the threshold storing section 23 (No in step S507A), it is seen that propriety of threshold update does not have to be determined. In this case, the update-propriety determining section 22c executes update for overwriting the threshold Th1A calculated in step S506A with the threshold Th0A stored in the threshold storing section 23 (step S512A) and ends the processing.

(2.2) Branch B

For example, when the distance D to the imaging apparatus 5 is the long distance "1" (No in step S1101), the distribution updating section 22a updates the histogram H1B of the nodding depth for the long distance by incrementing a frequency corresponding to the nodding depth d calculated in step S502 among the frequencies of the histogram H1B of the nodding depth saved in the work area of the internal memory (step S503B).

Subsequently, the threshold calculating section 22b determines whether the number of measurement frames FrNum retained in the register is smaller than the specified number of frames Fr, that is, FrNum<Fr (step S504B). When the number of measurement frames FrNum is smaller than the specified number of frames Fr (Yes in step S504B), the threshold calculating section 22b skips the following processing and ends the processing.

On the other hand, when the number of measurement frames FrNum is not smaller than the specified number of frames Fr (No in step S504B), it is seen that the specified number of frames Fr has elapsed from a start of the creation of the histogram H1B of the nodding depth for the long distance. In this case, the threshold calculating section 22b detects a first peak and a second peak included in the histogram H1B of the nodding depth for the long distance (step S505B). Then, the threshold calculating section 22b calculates, according to the mode method or the like, as the threshold Th1B, a threshold that may separate two ridges of the first peak and the second peak, for example, depth of a nod at a minimum value of a trough formed between the two ridges (step S506B).

Subsequently, the update-propriety determining section 22c determines whether the threshold Th0B is registered in the threshold storing section 23, in other words, for example, whether a value of the threshold Th0B is not a NULL value (step S507B). At this time, when the threshold Th0B is registered in the threshold storing section 23 (Yes in step S507B), the update-propriety determining section 22c calculates, for each of a histogram H0B used for the calculation of the threshold Th0B and the histogram H1B used for the calculation of the threshold Th1B, a difference between a nodding depth corresponding to the first peak and a nodding depth corresponding to the second peak (step S508B).

Then, the update-propriety determining section 22c determines whether a gap between the difference between the nodding depths of the first peak and the second peak in the histogram H0B of the nodding depth and the difference between the nodding depths of the first peak and the second peak in the histogram H1B of the nodding depth is equal to or larger than a predetermined value (step S509B).

When the gap between the differences is equal to or larger than the predetermined value (Yes in step S509B), it is more likely that a person included in an image frame at a point in time when the threshold Th0B is registered and a person included in an image frame at a point in time when the threshold Th1B is registered are not the same person. In this case, it is more likely that a nod is not accurately classified if the threshold Th0B is used. Therefore, it is more likely that the threshold Th0B is desirably overwritten with the threshold Th1B. Therefore, the update-propriety determining section 22c further performs comparison of an area of the histogram H0B of the nodding depth and an area of the histogram H1B of the nodding depth (step S510B).

When the area of the histogram H1B of the nodding depth is larger than an added-up value obtained by adding a predetermined area α to the area of the histogram H0B of the nodding depth, that is, the area of H1B>the area of H0B+α (Yes in step S511B), it is more likely that the person included in the image frame at the point in time when the threshold Th0B is registered and the person included in the image frame at the point in time when the threshold Th1B is registered are not the same person. In this case, the update-propriety determining section 22c executes update for overwriting the threshold Th1B calculated in step S506B with the threshold Th0B stored in the threshold storing section 23 (step S512B) and ends the processing.

On the other hand, when the gap is not equal to or larger than the predetermined value or when the area of the histogram H1B of the nodding depth is not larger than the added-up value obtained by adding the predetermined area α to the area of the histogram H0B of the nodding depth (No in step S509B or No in step S511B), it is still likely that the person included in the image frame at the point in time when the threshold Th0B is registered and the person included in the image frame at the point in time when the threshold Th1B is registered are the same person. In this case, the overwriting update in step S512B is not carried out. The processing directly ends.

When the threshold Th0B is not registered in the threshold storing section 23 (No in step S507B), it is seen that propriety of threshold update does not have to be determined. In this case, the update-propriety determining section 22c executes update for overwriting the threshold Th1B calculated in step S506B with the threshold Th0B stored in the threshold storing section 23 (step S512B) and ends the processing.

(3) Threshold Readout Processing

Figure 16:
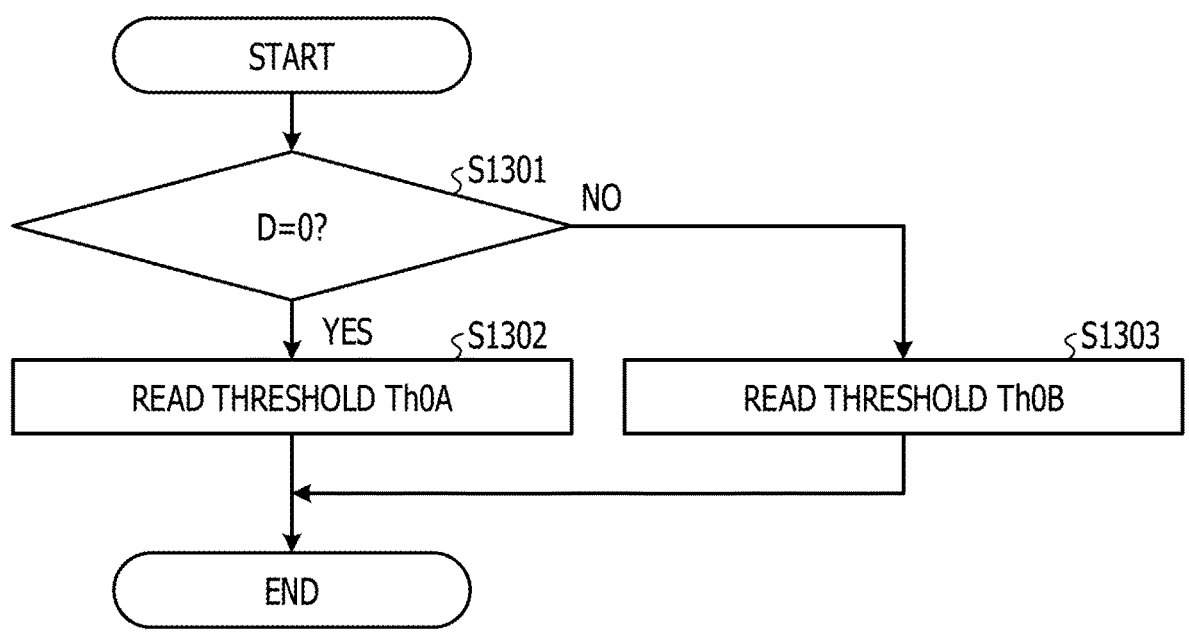
FIG. 16 is a flowchart illustrating a procedure of threshold readout processing according to the second embodiment.

FIG. 16 is a flowchart illustrating a procedure of threshold readout processing according to the second embodiment. As an example, this processing may be executed instead of the processing in step S106 illustrated in FIG. 5. As illustrated in FIG. 16, the classifying section 24 determines whether the distance D is the short distance "0" (step S1301).

When the distance D is the short distance "0" (Yes in step S1301), the classifying section 24 reads the threshold Th0A from the threshold storing section 23 (step S1302) and ends the processing. On the other hand, when the distance D is the long distance "1" (No in step S1301), the classifying section 24 reads the threshold Th0B from the threshold storing section 23 (step S1303) and ends the processing.

One Aspect of an Effect of the Second Embodiment

As explained above, like the image processing apparatus 10 according to the first embodiment, the image processing apparatus 20 according to this embodiment determines, based on the frequency distribution of the depth of the nod detected from the image frame captured by the imaging apparatus 5, the threshold for classifying the depth of the nod detected from the image frame into the shallow nod and the deep nod. Therefore, with the image processing apparatus 20 according to this embodiment, it is possible to classify nods having different depths. With the image processing apparatus 20 according to this embodiment, even when the positional relation between the imaging apparatus 5 and the object is not fixed, it is possible to suppress deterioration in classification accuracy.

The image processing apparatus 20 according to this embodiment switches the threshold Th0A for the short distance and the threshold Th0B for the long distance and uses the threshold Th0A for the short distance and the threshold Th0B for the long distance for the classification of the nodding motion according to whether the distance between the imaging apparatus 5 and the object is the short distance or the long distance. Therefore, with the image processing apparatus 20 according to this embodiment, it is possible to select a threshold according to the positional relation between the imaging apparatus 5 and the object. As a result, it is possible to more effectively suppress deterioration in classification accuracy.

Third Embodiment

The embodiments concerning the disclosed apparatus are explained above. However, the present disclosure may be carried out in various different forms other than the embodiments explained above. Therefore, in the following explanation, other embodiments included in the present disclosure are explained.

[Application Example of the Use Case]

In the first embodiment and the second embodiment, the customer service performed by the person is illustrated as the use case. However, the respective kinds of processing explained in the first embodiment and the second embodiment may also be applied when customer service is performed by a robot. For example, it is also possible to incorporate the imaging apparatus 5 in or attach the imaging apparatus 5 to the robot, incorporate the functions of the image processing apparatus 10 or the image processing apparatus 20 in a robot main body, convert nod information including a classification result of a nodding motion into a file and transfer the nod information to an external apparatus such as the server apparatus 200, and feedback a result of processing on the external apparatus to the robot.

[Application Example of the Threshold]

In the first embodiment and the second embodiment, it is assumed that the histogram of the nodding depth have the shape having the bimodality including the two ridges of the distribution corresponding to the shallow nod and the distribution corresponding to the deep nod. However, it could occur that two peaks are not necessarily present and only one peak is present. In this case, a nodding depth corresponding to one ridge peak may be calculated as the threshold.

[Dispersion and Integration]

The illustrated components of the apparatuses do not necessarily have to be physically configured as illustrated. That is, for example, a specific form of dispersion or integration of the components of the apparatuses is not limited to the illustrated form. All or a part of the components of the apparatuses may be functionally or physically dispersed or integrated in any unit according to various loads, a state of use, and the like. For example, a part of the functional sections of the image processing apparatus 10 or the image processing apparatus 20 may be connected through a network as external apparatuses of the image processing apparatus 10 or the image processing apparatus 20. Other apparatuses may respectively include a part of the functions of the image processing apparatus 10 or the image processing apparatus 20 and may be connected through a network and cooperate to realize the functions of the image processing apparatus 10 or the image processing apparatus 20 explained above.

[Image Processing Program]

The respective kinds of processing explained in the embodiments may be realized by executing a computer program prepared in advance with a computer such as a personal computer or a work station. Therefore, in the following explanation, an example of a computer that executes an image processing program having the same functions as the functions in the embodiments is explained with reference to FIG. 17.

Figure 17:
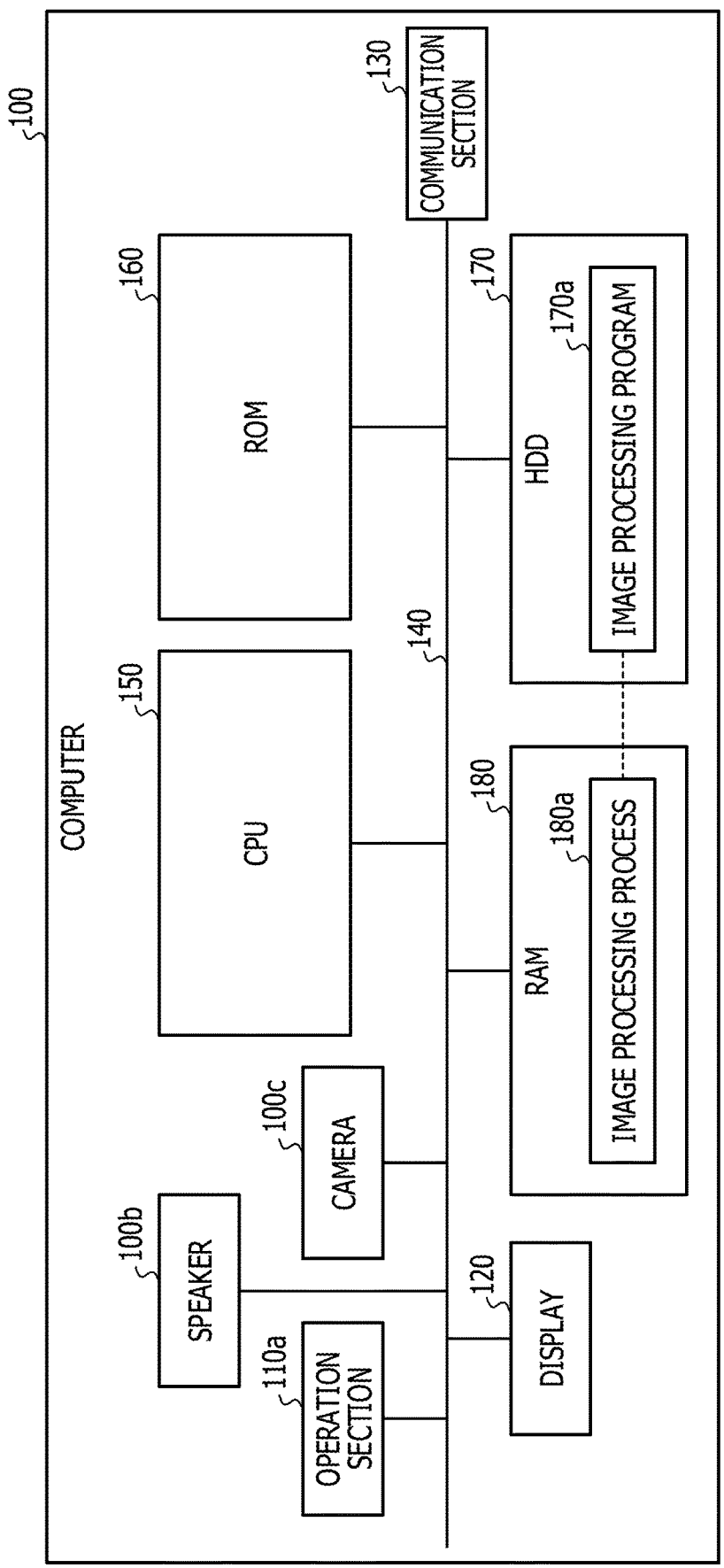
FIG. 17 is a diagram illustrating a hardware configuration example of a computer that executes image processing programs according to the first to third embodiments.

FIG. 17 is a diagram illustrating a hardware configuration example of a computer that executes an image processing program according to the first to third embodiments. As illustrated in FIG. 17, a computer 100 includes an operation section 110a, a speaker 110b, a camera 110c, a display 120, and a communication section 130. The computer 100 includes a CPU 150, a ROM 160, a HDD 170, and a RAM 180. These sections 110 to 180 are connected via a bus 140.

In the HDD 170, as illustrated in FIG. 17, an image processing program 170a that exerts the same functions as the functions of the acquiring section 11, the motion detecting section 13, the threshold determining section 15, and the classifying section 17 explained in the first embodiment is stored. The image processing program 170a may be integrated or separated like the components such as the acquiring section 11, the motion detecting section 13, the threshold determining section 15, and the classifying section 17 illustrated in FIG. 1. That is, for example, not all of the data explained in the first embodiment have to be stored in the HDD 170. Data used for processing only has to be stored in the HDD 170. In the above explanation, only as an example, the image processing program 170a that exerts the same functions as the functions of the acquiring section 11, the motion detecting section 13, the threshold determining section 15, and the classifying section 17 explained in the first embodiment is stored in the HDD 170. However, the image processing program 170a that exerts the same functions as the functions of the acquiring section 11, the motion detecting section 13, the distance estimating section 21, the threshold determining section 22, and the classifying section 24 explained in the second embodiment may be stored in the HDD 170.

Under such an environment, the CPU 150 reads the image processing program 170a from the HDD 170 and then develops the image processing program 170a on the RAM 180. As a result, the image processing program 170a functions as an image processing process 180a as illustrated in FIG. 17. The image processing process 180a develops, in a region allocated to the image processing process 180a in a storage region of the RAM 180, various data read from the HDD 170 and executes various kinds of processing using the developed various data. Examples of the processing executed by the image processing process 180a include the processing illustrated in FIGS. 5 to 8 and FIGS. 14 to 16. In the CPU 150, not all of the processing sections illustrated in the first embodiment have to operate. A processing section corresponding to execution target processing only has to be virtually realized.

The image processing program 170a does not necessarily have to be stored in the HDD 170 and the ROM 160 from the beginning. For example, the image processing program 170a may be stored in a "portable physical medium" such as a flexible disk, a so-called FD, a CD-ROM, a DVD disk, a magneto-optical disk, or an IC card inserted into the computer 100. The computer 100 may acquire the image processing program 170a from the portable physical medium and execute the image processing program 170a. The image processing program 170a may be stored in another computer or a server apparatus connected to the computer 100 via a public line, the Internet, a LAN, or a WAN. The computer 100 may acquire the image processing program 170a from the other computer or the server apparatus and execute the image processing program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for image processing, the method comprising:
   executing an acquisition processing that includes acquiring an image frame captured using an imaging apparatus;
   executing a determination processing that includes determining whether a head region is included in the acquired image frame;
   executing a calculation processing that includes calculating, when determining that the head region is included in the image frame, a first amount of change in time series of the head region by using a position of the head region in the image frame and a position of the head region included in another image frame following the image frame;
   executing a threshold determination processing that includes determining a threshold to be compared with the first amount of change based on a frequency distribution of amounts of change in time series of the head region included in a past image frame group prior to the acquired image frame; and
   executing an evaluation processing that includes evaluating the first amount of change by comparing the determined threshold and the first amount of change.

2. The method according to claim 1,
   wherein the threshold determination processing is configured to determine, as the threshold to be compared with the first amount of change, an amount of change corresponding to a trough portion formed between a first peak and a second peak included in the frequency distribution.

3. The method according to claim 1, further comprising
   executing an estimation processing that includes estimating a distance between the imaging apparatus and the head region from a ratio of the head region to the image frame,
   wherein the threshold determination processing is configured to
   determine a first threshold to be compared with the first amount of change based on a first frequency distribution of an amount of change in time series of the head region when the distance is equal to or longer than a predetermined value, and
   determine a second threshold to be compared with the first amount of change based on a second frequency distribution of the amount of change in time series of the head region when the distance is shorter than the predetermined value, and
   wherein the evaluation processing is configured to
   compare the determined first threshold and the first amount of change when the distance is equal to or longer than the predetermined value and evaluate the first amount of change, and
   compare the determined second threshold and the first amount of change when the distance is shorter than the predetermined value and evaluate the first amount of change.

4. An apparatus for image processing, the apparatus comprising:
   a memory; and
   a processor coupled to the memory, the processor being configured to
   execute an acquisition processing that includes acquiring an image frame captured using an imaging apparatus;
   execute a determination processing that includes determining whether a head region is included in the acquired image frame;
   execute a calculation processing that includes calculating, when determining that the head region is included in the image frame, a first amount of change in time series of the head region by using a position of the head region in the image frame and a position of the head region included in another image frame following the image frame;
   execute a threshold determination processing that includes determining a threshold to be compared with the first amount of change based on a frequency distribution of amounts of change in time series of the head region included in a past image frame group prior to the acquired image frame; and
   execute an evaluation processing that includes evaluating the first amount of change by comparing the determined threshold and the first amount of change.

5. The apparatus according to claim 4,
   wherein the threshold determination processing is configured to determine, as the threshold to be compared with the first amount of change, an amount of change corresponding to a trough portion formed between a first peak and a second peak included in the frequency distribution.

6. The apparatus according to claim 4,
wherein the processor is configured to
execute an estimation processing that includes estimating a distance between the imaging apparatus and the head region from a ratio of the head region to the image frame,
wherein the threshold determination processing is configured to
determine a first threshold to be compared with the first amount of change based on a first frequency distribution of an amount of change in time series of the head region when the distance is equal to or longer than a predetermined value, and
determine a second threshold to be compared with the first amount of change based on a second frequency distribution of the amount of change in time series of the head region when the distance is shorter than the predetermined value, and
wherein the evaluation processing is configured to
compare the determined first threshold and the first amount of change when the distance is equal to or longer than the predetermined value and evaluate the first amount of change, and
compare the determined second threshold and the first amount of change when the distance is shorter than the predetermined value and evaluate the first amount of change.

7. A non-transitory computer-readable storage medium for storing a program which causes a processor to perform processing for image processing, the processing comprising:
executing an acquisition processing that includes acquiring an image frame captured using an imaging apparatus;
executing a determination processing that includes determining whether a head region is included in the acquired image frame;
executing a calculation processing that includes calculating, when determining that the head region is included in the image frame, a first amount of change in time series of the head region by using a position of the head region in the image frame and a position of the head region included in another image frame following the image frame;
executing a threshold determination processing that includes determining a threshold to be compared with the first amount of change based on a frequency distribution of amounts of change in time series of the head region included in a past image frame group prior to the acquired image frame; and
executing an evaluation processing that includes evaluating the first amount of change by comparing the determined threshold and the first amount of change.

8. The non-transitory computer-readable storage medium according to claim 7,
wherein the threshold determination processing is configured to determine, as the threshold to be compared with the first amount of change, an amount of change corresponding to a trough portion formed between a first peak and a second peak included in the frequency distribution.

9. The non-transitory computer-readable storage medium according to claim 7, wherein the processing further comprising
executing an estimation processing that includes estimating a distance between the imaging apparatus and the head region from a ratio of the head region to the image frame,
wherein the threshold determination processing is configured to
determine a first threshold to be compared with the first amount of change based on a first frequency distribution of an amount of change in time series of the head region when the distance is equal to or longer than a predetermined value, and
determine a second threshold to be compared with the first amount of change based on a second frequency distribution of the amount of change in time series of the head region when the distance is shorter than the predetermined value, and
wherein the evaluation processing is configured to
compare the determined first threshold and the first amount of change when the distance is equal to or longer than the predetermined value and evaluate the first amount of change, and
compare the determined second threshold and the first amount of change when the distance is shorter than the predetermined value and evaluate the first amount of change.

* * * * *